(12) United States Patent
Uchimura et al.

(10) Patent No.: US 11,300,712 B2
(45) Date of Patent: *Apr. 12, 2022

(54) LAMINATE, POLARIZING PLATE, AND IMAGE DISPLAY DEVICE

(71) Applicant: FUJIFILM Corporation, Tokyo (JP)

(72) Inventors: Makoto Uchimura, Kanagawa (JP); Keigo Ueki, Kanagawa (JP); Takashi Tamada, Kanagawa (JP); Yuichi Fukushige, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 30 days.

This patent is subject to a terminal disclaimer.

(21) Appl. No.: 16/786,167

(22) Filed: Feb. 10, 2020

(65) Prior Publication Data

US 2020/0174162 A1    Jun. 4, 2020

Related U.S. Application Data

(63) Continuation of application No. PCT/JP2018/028184, filed on Jul. 27, 2018.

(30) Foreign Application Priority Data

Sep. 22, 2017 (JP) .............................. JP2017-182976
Nov. 20, 2017 (JP) .............................. JP2017-223096

(51) Int. Cl.
   *G02B 1/14* (2015.01)
(52) U.S. Cl.
   CPC .................................... *G02B 1/14* (2015.01)

(58) Field of Classification Search
None
See application file for complete search history.

(56) References Cited

U.S. PATENT DOCUMENTS

| 2008/0211984 | A1* | 9/2008 | Sugibayashi | ............ H01J 11/44 349/58 |
| 2009/0239048 | A1* | 9/2009 | Sugihara | ............ G02B 27/0006 428/212 |
| 2017/0038508 | A1 | 2/2017 | Taka | |
| 2019/0324598 | A1 | 10/2019 | Ueki et al. | |

FOREIGN PATENT DOCUMENTS

| CN | 1641481 A | 7/2005 |
| CN | 104419036 A | 3/2015 |
| CN | 106233169 A | 12/2016 |
| CN | 106471276 A | 3/2017 |
| JP | 2014-049525 A | 3/2014 |
| JP | 2016-060117 A | 4/2016 |
| JP | 2016-124292 A | 7/2016 |
| JP | 2017-095734 A | 6/2017 |

(Continued)

OTHER PUBLICATIONS

Translation of JPWO 2014/141866 A1 (Year: 2014).*

(Continued)

*Primary Examiner* — Ramsey Zacharia
(74) *Attorney, Agent, or Firm* — Edwards Neils LLC; Jean C. Edwards, Esq.

(57) ABSTRACT

A laminate includes a shock absorbing layer, a support, and a hard coat layer, in which the shock absorbing layer has a maximum value of tan δ in a frequency range of $10^4$ to $10^{13}$ Hz at 25° C. The tan δ is a ratio of a loss modulus with respect to a storage modulus.

15 Claims, 2 Drawing Sheets

(56) References Cited

FOREIGN PATENT DOCUMENTS

| KR | 20130101287 A | 9/2013 |
|----|---------------|--------|
| KR | 20150077134 A | 7/2015 |
| WO | 2014/141866 A1 | 9/2014 |
| WO | 2015/029860 A1 | 3/2015 |
| WO | 2016/093133 A1 | 6/2016 |
| WO | 2018/159727 A1 | 9/2018 |

OTHER PUBLICATIONS

Translation of JPWO2016/093133 A1 (Year: 2016).*
International Search Report issued in PCT/JP2018/028184 dated Oct. 16, 2018.
Written Opinion of the International Seaching Authority issued in PCT/JP2018/028184 dated Oct. 16, 2018.
International Preliminary Report on Patentability issued in PCT/JP2018/028184 dated Mar. 24, 2020.
Office Action, issued by the Japanese Patent Office dated Nov. 10, 2020, in connection with Japanese Patent Application No. 2019-543456.
Office Action, issued by the Japanese Patent Office dated Apr. 13, 2021, in connection with Japanese Patent Application No. 2019-543456.
Office Action, issued by the State Intellectual Property Office dated Jun. 2, 2021, in connection with Chinese Patent Application No. 201880056054.6.
Office Action, issued by the State Intellectual Property Office dated Dec. 8, 2021, in connection with Chinese Patent Application No. 201880056054.6.

* cited by examiner

//LAMINATE, POLARIZING PLATE, AND IMAGE DISPLAY DEVICE

CROSS-REFERENCE TO RELATED APPLICATIONS

This application is a Continuation of PCT International Application No. PCT/JP2018/028184, filed on Jul. 27, 2018, which was published under PCT Article 21(2) in Japanese, and which claims priority under 35 U.S.C. § 119(a) to Japanese Patent Application No. 2017-182976, filed on Sep. 22, 2017 and Japanese Patent Application No. 2017-223096, filed on Nov. 20, 2017. The above applications are hereby expressly incorporated by reference, in their entirety, into the present application.

BACKGROUND OF THE INVENTION

1. Field of the invention

The present invention relates to a laminate, a polarizing plate, and an image display device.

2. Description of the Related Art

In an image display device such as a display device using a cathode ray tube (CRT), a plasma display (PDP), an electroluminescent display (ELD), a vacuum fluorescent display (VFD), a field emission display (FED), and a liquid crystal display (LCD), it is suitable to provide a hard coat film having a hard coat layer on a support (base material) in order to prevent scratches on the display surface.

For example, WO2014/141866A and JP2016-060117A disclose hard coat films having a hard coat layer on one surface of a base material and having a urethane resin layer on the other surface.

SUMMARY OF THE INVENTION

In WO2014/141866A and JP2016-060117A, although the improvement of impact resistance and scratch resistance for the hard coat film is described, by the investigation of the present inventors, it has been found that there is a new problem that in a case where the hard coat layer is rubbed in contact with another object, the shape of the object is transferred to the hard coat layer.

For example, in a case where a notebook computer (notebook PC) including a hard coat film on the display surface is transported in a folded state, there may be a problem that the trace of a keyboard is transferred to the display surface by applying a load from the outside, cratering is generated in the display surface by interposing foreign substances between the display and the keyboard, or the display surface is scratched (hereinafter, also referred to as "keyboard reflection"). In addition, for example, in a case where a smartphone provided with a hard coat film on the display surface is put in a case and transported, the inner shape of a case may be transferred to the display surface by applying a load to the case.

The present invention is made in consideration of the above problems, and an object thereof is to provide a laminate having a hard coat layer and capable of suppressing transfer of the shape of another object to the hard coat layer, and a polarizing plate and an image display device having the laminate.

As a result of conducting intensive investigations, the present inventors have found that the above object can be achieved by a laminate having a shock absorbing layer having a maximum value of tan δ in a specific frequency range.

That is, the above object can be solved by the following means.

<1>
A laminate comprising: a shock absorbing layer; a support; and a hard coat layer,
in which the shock absorbing layer has a maximum value of tan δ in a frequency range of $10^4$ to $10^{13}$ Hz at 25° C., where the tan δ is a ratio of a loss modulus with respect to a storage modulus.

<2>
The laminate according to <1>, in which the maximum value of tan δ is 0.1 or more.

<3>
The laminate according to <1> or <2>, in which a storage modulus of the shock absorbing layer at a frequency showing the maximum value of tan δ is 30 MPa or more.

<4>
The laminate according to any one of <1> to <3>, in which the shock absorbing layer has a thickness of 10 to 200 μm.

<5>
The laminate according to any one of <1> to <4>, in which the shock absorbing layer includes a block copolymer of methyl methacrylate and n-butyl acrylate.

<6>
The laminate according to any one of <1> to <5>, further comprising: an inorganic oxide layer.

<7>
The laminate according to any one of <1> to <6>, in which the hard coat layer includes a cured product of a polymerizable compound.

<8>
A polarizing plate comprising: a polarizer; and the laminate according to e of <1> to <7>including the polarizer.

<9>
An image display device comprising: the laminate according to any one of <1> to <7> or the polarizing plate according to <8>.

In the present specification, the numerical range expressed herein using "to" means a range including the numerical values before and after "to" as the lower limit value and the upper limit value.

In the present specification, the term "(meth)acrylate" is used to mean either or both of acrylate and methacrylate. In addition, the term "(meth)acryloyl group" is used to mean either or both of an acryloyl group and a methacryloyl group. The term "(meth)acryl is used to mean either or both of acryl and methacryl.

In the present specification, the weight-average molecular weight (Mw) can be measured as a molecular weight expressed in terms of polystyrene by gel permeation chromatography (GPC) unless otherwise specified. At this time, HLC-8220 (manufactured by Tosoh Corporation) is used as a GPC apparatus, G3000HXL+G2000HXL are used as columns, and the weight-average molecular weight is detected by a refractive index (RI) at 23° C. at a flow rate of 1 mL/min. An eluent can be selected from tetrahydrofuran (THF), chloroform, N-methyl-2-pyrrolidone (NMP), and m-cresol/chloroform (manufactured by Shonan Wako Pure Chemical Industries, Ltd.), and THF is used in a case where the target material is dissolved therein.

According to the present invention, it is possible to provide a laminate having a hard coat layer and capable of suppressing transfer of the shape of another object to the hard coat layer, and a polarizing plate and an image display device having the laminate.

DESCRIPTION OF THE PREFERRED EMBODIMENTS

Hereinafter, the present invention will be described in detail.

[Laminate]

A laminate according to an embodiment of the present invention is a laminate having a shock absorbing layer, a support, and a hard coat layer, and the shock absorbing layer has a maximum value of tan δ in a frequency range of $10^4$ to $10^{13}$ Hz at 25° C.

However, the tan δ (loss tangent) is a ratio of a loss modulus with respect to a storage modulus.

Figure 1:
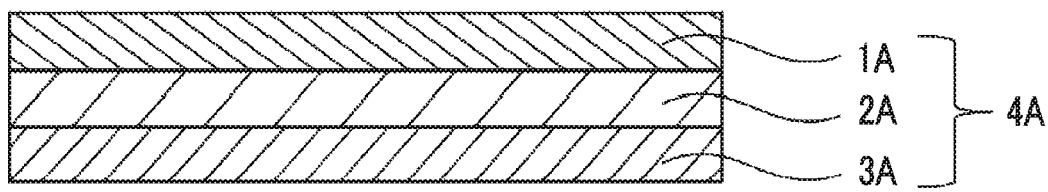
FIG. 1 is a schematic cross-sectional view showing a configuration of a laminate according to the present invention.

An example of a preferable embodiment of a laminate according to the present invention is shown in FIG. 1. A laminate 4A shown in FIG. 1 is a laminate including a support 2A, a hard coat layer 1A arranged on one surface of the support 2A (hereinafter, also referred to as a "HC layer"), and a shock absorbing layer 3A arranged on the surface opposite to the surface on which the FTC layer 1A is formed. Another preferable embodiment of the laminate of the present invention is a laminate including a shock absorbing layer, a support arranged on one side of the shock absorbing layer, and a hard coat layer arranged on the side opposite to the surface on which the support is arranged.

Since the laminate according to the embodiment of the present invention has the above configuration, transfer of the shape of another object to the hard coat layer can be sufficiently suppressed.

As an example of the transfer of the shape of another object to the hard coat layer, for example, keyboard reflection is considered to be generated by an impact at the time of contact between the keyboard and the display and rubbing on the display surface by the keyboard after the contact. The frequency of vibration generated by transportation or the like is considered to be in a range of 1 to $10^3$ Hz (refer to JIS Z 0232, ASTM D 4169, and the like). In the present invention, it is presumed that the above-mentioned impact and rubbing can be reduced by forming a laminate in which the shock absorbing layer having a maximum value of tan δ at 25° C. in a range of $10^4$ to $10^{13}$ Hz is provided, for example, on the opposite side of the hard coat layer with the support interposed therebetween, and thus transfer of the shape of another object to the hard coat layer (for example, keyboard reflection) can be suppressed.

In addition, since the laminate of the present invention has the above configuration, the shock absorbability (falling ball resistance) with respect to falling of an object is excellent.

In the present invention, regarding the relationship between the frequency at 25° C. and tan δ of the shock absorbing layer, a graph of frequency—tan δ is created by the following method, and the maximum value of tan δ and the frequency showing the maximum value are obtained.

(Method of Preparing Sample)

A coating solution obtained by dissolving or melting a material for forming a shock absorbing layer in a solvent is applied to a release-treated surface of a release sheet having undergone a release treatment and dried so as to have a thickness of 10 to 50 μm after drying, and then the shock absorbing layer is peeled off from the release sheet to prepare a test piece of the shock absorbing layer.

(Measurement Method)

The test piece which is humidity-controlled in advance for 2 hours or longer in an atmosphere of a temperature of 25° C. and a relative humidity of 60% is measured using a dynamic viscoelasticity meter, (DVA-225 manufactured by manufactured by IT Keisoku Seigyo K.K.) in a "Stepwise heating/Frequency Dispersion" mode under the following conditions. Then, a master curve of tan δ with respect to the frequency at 25° C., a storage modulus E', and a loss modulus E" is obtained by "Master Curve" edition. The maximum value of tan δ and a frequency showing the maximum value are obtained from the obtained master curve.

Sample: 5 mm×30 min
Grip distance: 20 mm
Set stress: 0.10%
Measurement temperature: −40° C. to 40° C.
Heating condition: 2° C./min The shock absorbing layer may have at least one maximum value of tan δ in a frequency range of $10^4$ to $10^{13}$ Hz at 25° C., and may have two or more maximum values of tan δ in a frequency range of $10^4$ to $10^{13}$ Hz. In addition, the shock absorbing layer may further have a maximum value of tan δ outside the frequency range of $10^4$ to $10^{13}$ Hz and the maximum value may be the largest value.

The shock absorbing layer preferably has at least one maximum value of tan δ in a frequency range of $10^4$ to $10^{13}$ Hz at 25° C., more preferably has at least one maximum value of tan δ in a frequency range of $10^5$ to $10^{12}$ Hz, and even more preferably has at least one maximum value of tan δ in a frequency range of $10^6$ to $10^{11}$ Hz.

The maximum value of tan δ of the shock absorbing layer at 25° C. is preferably 0.1 or more and more preferably 0.2 or more from the viewpoint of shock absorption. In addition, from the viewpoint of hardness, the maximum value of tan δ of the shock absorbing layer at 25° C. is preferably 3.0 or less.

The storage modulus (E') of the shock absorbing layer at the frequency showing the maximum value of tan δ is preferably 30 MPa or more. Since the E' of the shock absorbing layer at the frequency showing the maximum value of tan δ is 30 MPa or more, the amount of displacement with respect to external stress does not increase, and the laminate and a display using the laminate as a front plate are not easily damaged due to deformation. The E of the shock absorbing layer at the frequency showing the maximum value of tan δ is more preferably 50 MPa or more. In addition, from the viewpoint of shock absorption, although not particularly limited, the E' of the shock absorbing layer at the frequency showing the maximum value of tan δ is practically $10^3$ MPa or less.

Hereinafter, the components and preparation of each layer constituting the laminate according to the embodiment of the present invention will be described in detail.

(1) Shock Absorbing Layer (Material of Shock Absorbing Layer)

The shock absorbing layer included in the laminate according to the embodiment of the present invention may be constituted of a resin as long as the maximum value of tan δ is given in the above-mentioned frequency range, and may be constituted of an elastomer (including oil extended rubber). It is preferable that the shock absorbing layer has transparency that can secure the visibility of the display contents in a case where the laminate is used as a protective film, a polarizing plate, or a front plate of an image display device, and can prevent damage to a thin glass laminated on the surface of the image display device resulting from pressing or shock to the protective film, the polarizing plate, or the front plate.

Examples of the resin include a 1,2-polybutadiene resin, an ethylene-vinyl acetate copolymer (EVA, usually contains 3% by mass or more of vinyl acetate units), a polyolefin resin such as polyethylene, a polyvinyl chloride resin, a polystyrene resin, a polyacrylic resin (such as methacrylate resin), a vinyl ester resin (excluding EVA), a saturated polyester resin, a polyamide resin, a fluororesin such as polyvinylidene fluoride, a polycarbonate resin, a polyacetal resin, an epoxy resin, a (meth)acrylic resin, an unsaturated polyester resin, and a silicon resin.

Among these resins, a (meth)acrylic resin or the like is preferable.

Examples of the elastomer include a polymer or block copolymer of a conjugated diene, an acrylic polymer or block copolymer, a styrene-based polymer or block copolymer, a block copolymer of an aromatic vinyl compound and a conjugated diene, a hydrogenated product of a polymer or block copolymer of a conjugated diene, a hydrogenated product of a block copolymer of an aromatic vinyl compound and a conjugated diene, an ethylene-α-olefin-based copolymer, a polar group-modified olefin-based copolymer, an elastomer formed of a polar group-modified olefin-based copolymer and a metal ion and/or a metal compound, nitrile-based rubber such as acrylonitrile-butadiene-based rubber, butyl rubber, acrylic rubber, a thermoplastic elastomer such as thermoplastic polyolefin elastomer (TPO), thermoplastic polyester elastomer (TPEE), and thermoplastic polyamide elastomer (TPAE), a diene-based elastomer (such as 1,2-polybutadine), a silicone-based elastomer, and a fluorine-based elastomer.

Among these elastomers, an acrylic polymer or block copolymer, a styrene-based polymer or block copolymer, and a silicone-based elastomer are preferable, and an acrylic polymer or block copolymer and a styrene-based polymer or block copolymer are particularly preferable. Examples of the acrylic block copolymer include a block copolymer of methyl methacrylate and n-butyl acrylate (also referred to as "PMMA-PnBA copolymer") and the like. Examples of the styrene-based block copolymer include a block copolymer of styrene and isoprene or butene and the like. The resin or elastomer that can be contained in the shock absorbing layer may be synthesized by known methods, or commercially available products may be used. Examples of the commercially available products include KURARITY LA2140e, KURARITY LA2250, KURARITY LA4285, HYBRAR 5127, and HYBRAR 7311F (trade names, manufactured by Kuraray Co., Ltd.).

From the viewpoint of balance between solubility in a solvent and hardness, the weight-average molecular weight of the resin or elastomer is preferably $10^4$ to $10^6$ and more preferably $5 \times 10^4$ to $5 \times 10^5$.

The shock absorbing layer of the laminate according to the embodiment of the present invention has the maximum value of tan δ in the above-mentioned frequency range, but it is presumed that in which frequency range tan δ has the maximum value is related to the mobility of the main chain or side chain of the resin or elastomer constituting the shock absorbing layer. Accordingly, it is estimated that a resin or an elastomer having the same structure has the maximum value of tan δ in the same frequency range.

The content of the resin or elastomer in the shock absorbing layer is preferably 50% to 100% by mass with respect to the total mass of the shock absorbing layer.

(Additives)

The shock absorbing layer can be formed only using the above-mentioned resin or elastomer as a constituting material and may further contain additives in addition to the resin or elastomer described above. Examples of the additives include an adhesion improving agent, a softener, a plasticizer, a lubricant, a crosslinking agent, a crosslinking aid, a photosensitizer, an antioxidant, an anti-aging agent, a heat stabilizer, a flame retardant, an antibacterial or antifungal agent, a weathering agent, an ultraviolet absorber, a viscosity imparting agent, a nucleating agent, a pigment, a dye, an organic filler, an inorganic filler, a silane coupling agent, and a titanium coupling agent. In addition, polymers other than the above-mentioned resin and elastomer may be contained.

The adhesion improving agent to be added to the shock absorbing layer is not particularly limited, and for example, a rosin ester resin, a hydrogenated rosin ester resin, a petrochemical resin, a hydrogenated petrochemical resin, a terpene resin, a terpene phenol resin, an aromatic modified terpene resin, a hydrogenated terpene resin, an alkyl phenol resin, and the like can be used. These may be used singly, or two or more kinds of these may be used in combination. Examples of commercially available products thereof include SUPER ESTER L, SUPER ESTER A-18, SUPER ESTER A-75, SUPER ESTER A-100, SUPER ESTER A-115, and SUPER ESTER A-125 (trade names, manufactured by Arakawa Chemical Industries, Ltd.).

The content of the additives other than above-mentioned resin or elastomer in the shock absorbing layer is preferably 50% by mass or less with respect to the total mass of the shock absorbing layer.

(Method of Forming Shock Absorbing Layer)

The method of forming the shock absorbing layer is not particularly limited and examples thereof include a coating method, a casting method (a solventless casting method or a solvent casting method), a press method, an extrusion method, an injection molding method, a cast molding method, and an inflation method. Specifically, by preparing a liquid substance, in which the above-mentioned material for forming a shock absorbing layer is dissolved or dispersed in a solvent, or a melt of components constituting the above-mentioned material for forming a shock absorbing layer, then applying the liquid substance or melt to one surface (the surface opposite to the hard coat layer forming surface) of a support described later, and then removing the solvent if necessary, a laminate in which the shock absorbing layer is laminated can be prepared.

In addition, by applying the liquid substance or melt to a release-treated surface of a release sheet having undergone a release treatment, and drying the liquid substance or melt to form a sheet having a shock absorbing layer, and bonding the shock absorbing layer and the support, a laminate in which the shock absorbing layer is laminated can be prepared.

In a case where the shock absorbing layer is constituted of the above-mentioned resin, the shock absorbing layer may be constituted of a non-crosslinked resin, or a at least partially crosslinked resin. The method of crosslinking the resin is not particularly limited, and examples thereof include means selected from methods using electron beam irradiation, ultraviolet irradiation, and a crosslinking agent (for example, an organic peroxide or the like). In a case where the resin is crosslinked by electron beam irradiation, by irradiating the obtained shock absorbing layer (before crosslinking) with electron beams from an electron beam irradiation apparatus, crosslinks can be formed. In a case of ultraviolet irradiation, by irradiating the obtained shock absorbing layer (before crosslinking) with ultraviolet rays from an ultraviolet irradiation apparatus, crosslinks can be formed by the effect of a photosensitizer which is optionally mixed in. Furthermore, in a case where a crosslinking agent is used, generally, by heating the obtained shock absorbing layer (before crosslinking) in an anaerobic atmosphere such as a nitrogen atmosphere, crosslinks can be formed by the effect of a crosslinking agent such as an organic peroxide optionally mixed and a crosslinking aid.

(Film Thickness)

The film thickness (thickness) of the shock absorbing layer of the laminate according to the embodiment of the present invention is preferably 5 µm or more, more preferably 8 µm or more, even more preferably 10 µm or more, and particularly preferably 25 µm or more from the viewpoint of suppressing transfer of the shape of another object to the hard coat layer. In addition, the film thickness is preferably 200 µm or less from the viewpoint of film hardness.

(2) Support (Material of Support)

The material of the support (hereinafter, also referred to a resin film) used in the present invention is not particularly limited.

It is preferable that the support is transparent. The term "transparent" in the present specification means that the transmittance of visible light is 80% or more and preferably 90% or more.

Examples of the resin film include an acrylic resin film, a polycarbonate (PC)-based resin film, a cellulose ester-based resin film such as a triacetyl cellulose (TAC)-based resin film, a polyethylene terephthalate (PET)-based resin film, a polyolefin-based resin film, a polyester-based resin film, a polyimide-based resin film, and an acrylonitrile-butadiene-styrene copolymer film. Among these, a film selected from an acrylic resin film, a cellulose ester-based resin film, a polyethylene terephthalate-based resin film, a polyimide-based resin film, and a polycarbonate-based resin film is preferable.

From the viewpoint of moisture permeability, a cellulose ester-based resin film is more preferable. From the viewpoint of shock absorbability, a polyimide-based resin film is also preferable.

In addition, the acrylic resin film refers to a resin film of a polymer or a copolymer formed of one or more kinds of compounds selected from the group consisting of an acrylic acid ester and a methacrylic acid ester. Examples of the acrylic resin film include a polymethyl methacrylate resin (PMMA) film.

The weight-average molecular weight of the resin is preferably 10,000 to 1000,000 and more preferably 100,000 to 1000,000.

(Constitution of Resin Film)

The constitution of the resin film is not limited. The resin film may be a single layer or a laminated film including two or more layers. In a case where the resin film is preferably a laminated film including two or more layers, the number of laminated films to be laminated. is preferably 2 to 10, more preferably 2 to 5, and even more preferably 2 or 3. In a case where the resin film includes 3 or more layers, it is preferable that outer layers and layers (a core layer and the like) other than the outer layers are films of different compositions. Furthermore, it is preferable that the outer layers are films of the same composition.

(Additives)

The resin film may contain additives in addition to the above-motioned resin. Examples of the additives include inorganic particles, matt panicles, an ultraviolet absorber, a fluorine-containing compound, a surface conditioner, a leveling agent, and the like described in the description of the hard coat layer which will be described later.

(Thickness of Support)

From the viewpoint of shock absorbability and falling ball resistance, the film thickness of the support is preferably 80 µm or more, more preferably 90 µm or more, and particularly preferably 100 µm or more. In addition, from the viewpoint of brittleness, the film thickness of the support is preferably 300 µm or less and more preferably 200 µm or less.

(Method of Forming Resin Film)

The resin film may be formed by any known method for example, a melting film forming method and a solution film forming method may be used.

(3) Hard Coat Layer (HC Layer)

The laminate according to the embodiment of the present invention has a hard coat layer (HC layer). The HC layer is preferably arranged on one surface of the support.

The HC layer used in the present invention can be obtained by irradiating a curable composition for forming an HC layer with active energy rays to cure the composition. In the present specification, the term "active energy ray" refer to ionizing radiation and includes X-rays, ultraviolet rays, visible rays, infrared rays, electron beams, α-rays, β-rays, γ-rays, and the like.

The curable composition for forming an HC layer used for forming the HC layer includes at least one kind of component having a property of being cured by the irradiation of active energy rays (hereinafter, also referred to as "active energy ray curable component"). As the active energy ray curable component, at least one kind of polymerizable compound which is selected from the group consisting of a radically polymerizable compound and a cationically polymerizable compound is preferable. In the present specification, the "polymerizable compound" is a compound having one or more polymerizable groups in one molecule. The polymerizable group is a group which can take a part in a polymerization reaction. Examples of the polymerization reaction include various polymerization reactions such as radical polymerization, cationic polymerization, and anionic polymerization.

The HC layer in the laminate according to the embodiment of the present invention preferably includes a cured product of the polymerizable compound.

The polymerizable compound is preferably a polymerizable compound having two or more ethylenically unsaturated groups in one molecule. The ethylenically unsaturated group refers to a functional group containing an ethylenically unsaturated double bond. Examples of the polymerizable compound having two or more ethylenically unsaturated groups in one molecule include esters of a polyhydric alcohol and (meth)acrylic acid [for example, ethylene glycol di(meth)acrylate, diethylene glycol di(meth)acrylate, butanediol di(meth)acrylate, hexanediol di(meth)acrylate, 1,4-cyclohexane diacrylate, pentaerythritol tetra(meth)acrylate, pentaerythritol tri(meth)acrylate, trimethylolpropane tri(meth)acrylate, trimethylolethane tri(meth)acrylate, dipentaerythritol tetra(meth)acrylate, dipentaerythritol penta (meth)acrylate, dipentaerythritol hexa(meth)acrylate, pentaerythritol hexa(meth)acrylate, 1,2,3-cyclohexanetetramethacrylate, polyurethane polyacrylate, and polyester polyacrylate], ethylene oxide-modified products, polyethylene oxide-modified products, and caprolactone-modified products of the above esters, vinyl benzene and derivatives thereof [for example, 1,4-dinylbenzene, 4-vinylbenzoic acid-2-acryloyl ethyl ester, and 1,4-divinylcyclohexanone], vinyl sulfone (for example, divinyl sulfone), acrylamide (for example, methylenebisacrylamide), and methacrylamide.

In addition, the polymerizable compound may be a compound having a canonically polymerizable group. As the canonically polymerizable group, an oxygen-containing heterocyclic group and a vinyl ether group can be preferably exemplified. The canonically polymerizable compound may contain one or more oxygen-containing heterocyclic groups and one or more vinyl ether groups in one molecule.

The oxygen-containing heterocyclic ring may be a monocyclic ring or a fused ring. Furthermore, it is also preferable that the oxygen-containing heterocyclic ring has a bicyclo skeleton. The oxygen-containing heterocyclic ring may be a non-aromatic ring or an aromatic ring, and is preferably a non-aromatic ring. Specific examples of the monocyclic ring include an epoxy ring, a tetrahydrofuran ring, and an oxetane ring. Examples of the oxygen-containing heterocyclic ring having a bicyclo skeleton include an oxabicyclo ring. The canonically polymerizable group containing the Oxygen-containing heterocyclic ring is contained in the canonically polymerizable compound as a monovalent substituent or a polyvalent substituent with a valency of 2 or higher. The above-mentioned fused ring may be a ring formed by the condensation of two or more oxygen-containing heterocyclic rings or a ring formed by the condensation of one or more oxygen-containing heterocyclic rings and one or more ring structures other than the oxygen-containing heterocyclic ring. The ring structure other than the oxygen-containing heterocyclic ring is not limited to the above, and examples thereof include a cycloalkane ring such as a cyclohexane ring.

The polymerizable compound may be a compound having both a canonically polymerizable group and a radically polymerizable group (preferably ethylenically unsaturated group).

Specific examples of the canonically polymerizable compound containing an oxygen-containing heterocyclic ring as a canonically polymerizable group include 3,4-epoxycyclohexlmethyl methacrylate (commercially available products such as CYCLOMER M100 manufactured by Daicel Corporation), 3,4-epoxycyclohexylmethyl-3',4'-epoxycyclohexane carboxylate (for example, commercially available products such as UVR 6105 and UVR 6110 manufactured by Union Carbide Corporation and CELLOXIDE 2021 manufactured by Daicel Corporation), bis(3,4-epoxycyclohexylmethyl)adipate (such as UVR 6128 manufactured by Union Carbide Corporation), vinylcyclohexene monoepoxide (such as CELLOXIDE 2000 manufactured by Daicel Corporation), ε-caprolactam-modified 3,4-epoxycyclohexylmethyl 3',4'-epoxycyclohexane carboxylate (such as CELLOXIDE 2081 manufactured by Daicel Corporation), 1-methyl-4-(2-methyloxiranyl)-7-oxabicyclo[4,1,0]heptane (such as CELLOXIDE 3000 manufactured by Daicel Corporation), 7,7'-dioxa-3,3'-bi[bicyclo[4.1.0]heptane] (such as CELLOXIDE 8000 manufactured by Daicel Corporation), 3-ethyl-3-hydroxymethyloxetane, 1,4-bis{[(3-ethyl-3-oxetanyl)methoxy]mehyl}benzene, 3-ethyl-3-(phenoxymethyl)oxetane, 3-ethyl-3-(2-ethylhexyloxymethyl)oxetane, and di[1-ethyl(3-oxetanyl)]methyl ether.

The content of the polymerizable compound with respect to the total solid content of the curable composition for forming an HC layer is preferably 15% to 99% by mass and more preferably 30% to 99% by mass. The solid content means components other than a solvent.

The HC layer used in the present invention may have a single layer structure or a laminated structure including two or more layers as described below.

Single Layer Structure

As a preferable aspect of the curable composition for forming an HC layer having a single layer structure, as a first aspect, a curable composition for forming an HC layer containing at least one kind of polymerizable compound having two or more ethylenically unsaturated groups in one molecule may be exemplified. The ethylenically unsaturated group refers to a functional group containing an ethylenically unsaturated double bond. Furthermore, as a second aspect, a curable composition for forming an HC layer containing at least one kind of radically polymerizable compound and at least one kind of cationically polymerizable compound can be exemplified.

Hereinafter, the curable composition for forming an HC layer of the first aspect will be described.

Examples of the polymerizable compound having two or more ethylenically unsaturated groups in one molecule that is contained in the curable composition for forming an HC layer of the first aspect include esters of a polyhydric alcohol and (meth)acrylic acid [for example, ethylene glycol di(meth)acrylate, diethylene glycol di(meth)acrylate, butanediol di(meth)acrylate, hexanediol di(meth)acrylate, 1,4-cyclohexane diacrylate, pentaerythritol tetra(meth)acrylate, pentaerythritol tri(meth)acrylate, trimethylolpropane tri(meth)acrylate, trimethylolethane tri(meth)acrylate, dipentaerythritol tetra(meth)acrylate, dipentaerythritol penta(meth)acrylate, dipentaerythritol hexa(meth)acrylate, pentaerythritol hexa(meth)acrylate, 1,2,3-cyclohexanetetramethacrylate, polyurethane polyacrylate, and polyester polyacrylate], ethylene oxide-modified products, polyethylene oxide-modified products, and caprolactone-modified products of the above esters, vinyl benzene and derivatives thereof [for example, 1,4-divinylbenzene, 4-vinylbenzoic acid-2-acryloyl ethyl ester, and 1,4-divinylcyclohexanone], vinyl sulfone (for example, divinyl sulfone), acrylamide (for example, methylenebisacrylamide), and methacrylamide.

The polymerizable compound having an ethylenically unsaturated group can be polymerized by the irradiation of active energy rays under the presence of a radical photopolymerization initiator. As the radical photopolymerization initiator, radical photopolymerization initiators which will be described later are preferably used. Regarding the content ratio between the radical photopolymerization initiator and the polymerizable compound having an ethylenically unsaturated group in the curable composition for forming an HC layer, the description regarding the content ratio between the radical photopolymerization initiator and the radically polymerizable compound that will be described later is preferably applied.

Next, the curable composition for forming an HC layer of the second aspect will be described.

The curable composition for forming an HC layer of the second aspect contains at least one kind of radically polymerizable compound and at least one kind of cationically polymerizable compound. As a preferable aspect, a curable composition for forming an HC layer can be exemplified which contains a radically polymerizable compound containing two or more radically polymerizable groups selected from the group consisting of an acryloyl group and a methacryloyl group in one molecule; and a cationically polymerizable compound.

The curable composition for forming an HC layer more preferably contains a radical photopolymerization initiator and a cationic photopolymerization initiator. As one preferable aspect of the second aspect, a curable composition for forming an HC layer can be exemplified which contains a radically polymerizable compound containing two or more radically polymerizable groups selected from the group consisting of an acryloyl group and a methacryloyl group in one molecule;

a canonically polymerizable compound;

a radical photopolymerization initiator; and a cationic photopolymerization initiator. Hereinafter, this aspect will be described as second aspect (1).

In the second aspect (1), it is preferable that the radically polymerizable compound contains two or more radically polymerizable groups in one molecule and one or more urethane bonds in one molecule.

As another preferable aspect of the second aspect, a curable composition for forming an HC layer can be exemplified which contains a) canonically polymerizable compound containing an alicyclic epoxy group and an ethylenically unsaturated group and having a molecular weight of 300 or less, in which the number of alicyclic epoxy groups contained in one molecule is 1 and the number of ethylenically unsaturated groups contained in one molecule is 1;

b) radically polymerizable compound containing three or more ethylenically unsaturated groups in one molecule;

c) radical polymerization initiator; and d) cationic polymerization initiator. Hereinafter, this aspect will be described as second aspect (2). Regarding the HC layer obtained by curing the curable composition for forming an HC layer of the second aspect (2), preferably, in a case where the total solid content of the HC layer is 100% by mass, the HC layer can contain a structure derived from a) in an amount of 15% to 70% by mass, a structure derived from b) in an amount of 25% to 80% by mass, c) in an amount of 0.1% to 10% by mass, and d) in an amount of 0.1% to 10% by mass. In addition, in an aspect, regarding the curable composition for forming an HC layer of the second aspect (2), in a case where the total solid content of the curable composition for forming an HC layer is 100% by mass, it is preferable that the curable composition for forming an HC layer of the second aspect (2) contains a) in an amount of 15% to 70% by mass. The term "alicyclic epoxy group" refers to a monovalent functional group having a cyclic structure in which an epoxy ring and a saturated hydrocarbon ring are fused.

Hereinafter, each of the components which can be contained in the curable composition for forming an HC layer of the second aspect and preferably the second aspect (1) or the second aspect (2) will be more specifically described.

—Radically Polymerizable Compound—

The curable composition for forming an HC layer of the second aspect contains at least one kind of radically polymerizable compound and at least one kind of cationically polymerizable compound. The radically polymerizable compound in the second aspect (1) contains two or more radically polymerizable groups selected from the group consisting of an acryloyl group and a methacryloyl group in one molecule. The number of radically polymerizable groups selected from the group consisting of an acryloyl group and a methactyloyl group that can be contained in one molecule of the radically polymerizable compound is preferably 2 to 10, for example, and more preferably 2 to 6.

As the radically polymerizable compound, a radically polymerizable compound having a molecular weight of 200 or more and less than 1,000 is preferable. In the present invention and the present specification, for a multimer, the term "molecular weight" refers to a weight-average molecular weight which is measured by Gel Permeation Chromatography GPC) and expressed in terms of polystyrene. As an example of specific measurement conditions of the weight-average molecular weight, the following measurement conditions can be exemplified.

GPC apparatus: HLC-8120 (manufactured by Tosoh Corporation)

Column: TSK gel Multipore HXL-M (manufactured by Tosoh Corporation, inner diameter of 7.8 mm×column length of 30.0 cm)

Eluent: tetrahydrofuran

As described above, the radically polymerizable compound preferably contains one or more urethane bonds in one molecule. The number of urethane bonds contained in one molecule of the radically polymerizable compound is preferably 1 or more, more preferably 2 or more, and even more preferably 2 to 5. For example, the radically polymerizable compound can contain two urethane bonds in one molecule. In the radically polymerizable compound containing two urethane bonds in one molecule, the radically polymerizable group selected from the group consisting of an acryloyl group and a methacryloyl group may be bonded to one of the urethane bonds directly or through a linking group or may be bonded to each of the two urethane bonds directly or through a linking group. In an aspect, it is preferable that one or more radically polymerizable groups selected from the group consisting of an acryloyl group and a methacryloyl group are bonded to each of two urethane bonds bonded to each other through a linking group.

More specifically, in the radically polymerizable compound, a urethane bond and a radically polymerizable group selected from the group consisting of an acryloyl group and a methacryloyl group may be directly bonded to each other, or a linking group may be present between a urethane bond and a radically polymerizable group selected from the group consisting of an acryloyl group and a methacryloyl group. The linking group is not particularly limited, and examples thereof include a linear or branched saturated or unsaturated hydrocarbon group, a cyclic group, and a group obtained by combining two or more of these groups. The number of carbon atoms on the hydrocarbon group is, for example, about 2 to 20 but is not particularly limited. As an example of a cyclic structure contained in the cyclic group, an aliphatic ring (such as a cyclohexane ring), an aromatic ring (such as a benzene ring or a naphthalene ring), or the like can be exemplified. These groups may be unsubstituted or may have a substituent. Unless otherwise specified, a group described in the present invention and the present specification may have a substituent or may be unsubstituted. In a case where a certain group has a substituent, examples of the substituent include an alkyl group (such as an alkyl group having 1 to 6 carbon atoms), a hydroxyl group, an alkoxy group (such as an alkoxy group having 1 to 6 carbon atoms), a halogen atom (such as a fluorine atom, a chlorine atom, or a bromine atom), a cyano group, an amino group, a nitro group, an acyl group, and a carboxy group.

The radically polymerizable compound described above can be synthesized by a known method. In addition, commercially available products may be used. As an example of the synthesis method, a method in which an alcohol, a polyol, and/or a hydroxyl group-containing compound such as hydroxyl group-containing (meth)acrylate are allowed to react with an isocyanate, and then, if necessary, a urethane compound obtained by the reaction is esterified using meth)acrylic acid can be exemplified. Herein, the term "(meth)acrylic acid" means either or both of acrylic acid and methacrylic acid.

Examples of commercially available products of the radically polymerizable compound containing one or more urethane bonds in one molecule include, but are not limited to, UA-306H, UA-3061, UA-306T, UA-510H, UF-8001G, UA-1011, UA-101T, AT-600, AH-600, AI-600, BPZA-66, and BPZA-100 manufactured by KYOEISHA CHEMICAL Co., LTD., U-4HA, U-6HA, UA-32P, U-15HA, and UA-1100H manufactured by Shin-Nakamura Chemical Co., Ltd., and SHIKOH UV-1400B, SHIKOH UV-1700B, SHIKOH UV-6300B, SHIKOH UV-7550B, SHIKOH UV-7600B, SHIKOH UV-7605B, SHIKOH UV-7610B, SHIKOH UV-7620EA, SHIKOH UV-7630B, SHIKOH UV-7640B, SHIKOH UV-6630B, SHIKOH UV-700013, SHIKOH UV-7510B, SHIKOH UV-7461TE, SHIKOH UV-3000B, SHIKOH UV-3200B, SHIKOH UV-3210EA, SHIKOH UV-3310EA, SHIKOH UV-3310B, SHIKOH UV-3500BA, SHIKOH UV-3520TL, SHIKOH UV-3700B, SHIKOH UV-6100B, SHIKOH UV-6640B, SHIKOH UV-2000B, SHIKOH UV-2010B, and SHIKOH UV-2250EA manufactured by The Nippon Synthetic Chemical Industry Co., Ltd. Examples thereof also include SHIKOH UV-2750B manufactured by The Nippon Synthetic Chemical Industry Co., Ltd., UL-503LN manufactured By KYOEISHA CHEMICAL Co., LED., UNIDIC 17-806, UNIDIC 17-813, UNIDIC V-4030, and UNIDIC V-4000BA manufactured by DIC Corporation, EB-1290K manufactured by Daicel-UCB Company, Ltd., and HI-CORP AU-2010 and HI-CORP AU-2020 manufactured by TOKUSHIKI Co., Ltd.

Specific examples of the radically polymerizable compound containing one or more urethane bond in one molecule are shown below, but the present invention is not limited to the following specific examples.

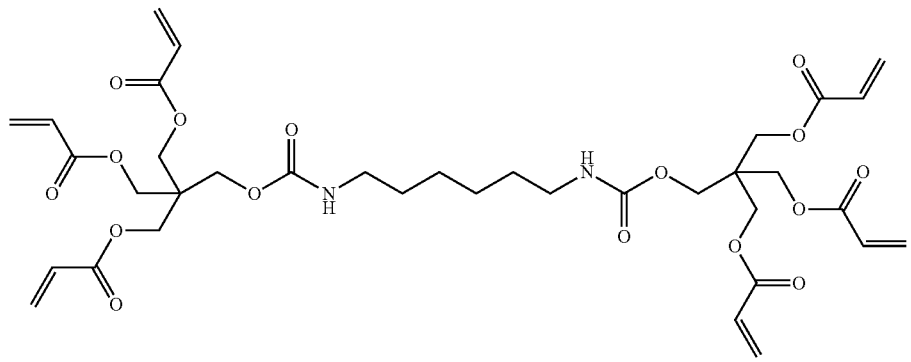

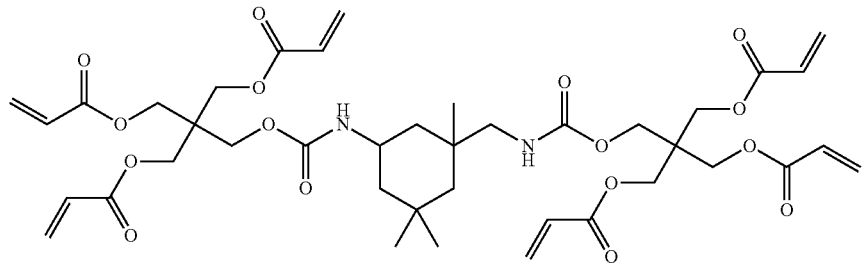

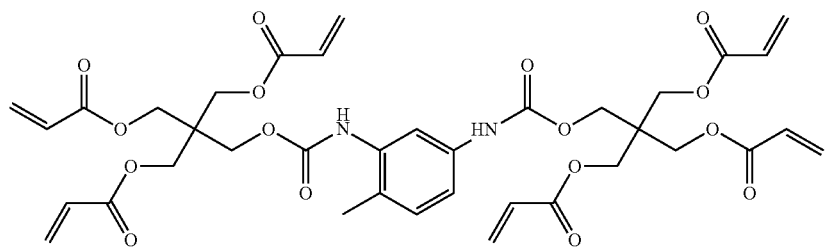

-continued

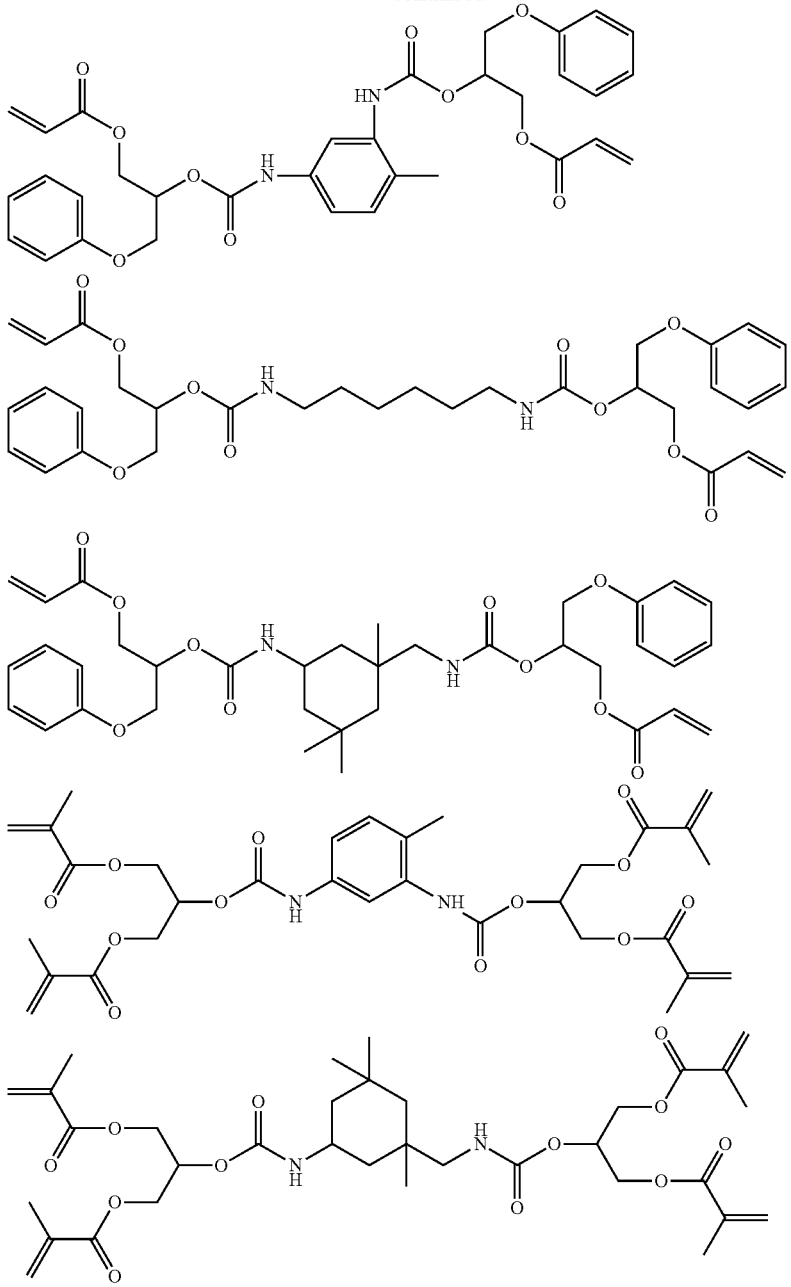

The radically polymerizable compound containing one or more urethane bonds in one molecule has been described above. However, the radically polymerizable compound containing two or more radically polymerizable groups selected from the group consisting of an acryloyl group and a methacryloyl group in one molecule may not have a urethane bond, In addition, the curable composition for forming an HC layer of the second aspect (1) may contain, in addition to the radically polymerizable compound containing two or more radically polymerizable groups selected from the group consisting of an acryloyl group and a methacryloyl group in one molecule, one or more kinds of radically polymerizable compounds other than the above radically polymerizable compound.

Hereinafter, the radically polymerizable compound which contains two or more radically polymerizable groups selected from the group consisting of an acryloyl group and a methacryloyl group in one molecule and contains one or more urethane bonds in one molecule will be described as first radically polymerizable compound, and a radically polymerizable compound which does not correspond to the first radically polymerizable compound will be described as "second radically polymerizable compound" regardless of whether or not the radically polymerizable compound contains two or more radically polymerizable groups selected from the group consisting of an acryloyl group and a methacryloyl group in one molecule. The second radically polymerizable compound may have one or more urethane bonds in one molecule or may not have a urethane bond. In a case where the first radically polymerizable compound and the second radically polymerizable compound are used in combination, the mass ratio of first radically polymerizable compound/second radically polymerizable compound is preferably 3/1 to 1/30, more preferably 2/1 to 1/20, and even more preferably 1/1 to 1/10.

In the curable composition for forming an HC layer of the second aspect (1), the content of the radically polymerizable compound (it does not matter whether or not this compound contains a urethane bond) containing two or more radically polymerizable groups selected from the group consisting of an acryloyl group and a methacryloyl group in one molecule is preferably 30% by mass or more, more preferably 50% by mass or more, and even more preferably 70% by mass or more, with respect to the total amount, 100% by mass, of the composition. In addition, in the curable composition for forming an FTC layer of the second aspect (1), the content of the radically polymerizable compound (it does not matter whether or not this compound contains a urethane bond) containing two or more radically polymerizable groups selected from the group consisting of an acryloyl group and a methacryloyl group in one molecule is preferably 98% by mass or less, more preferably 95% by mass or less, and even more preferably 90% by mass or less, with respect to the total amount, 100% by mass, of the composition.

The content of the first radically polymerizable compound in the curable composition for forming an HC layer of the second aspect (1) with respect to the total amount, 100% by mass, of the composition is preferably 30% by mass or more, more preferably 50% by mass or more, and even more preferably 70% by mass or more. Meanwhile, the content of the first radically polymerizable compound with respect to the total amount, 100% o by mass, of the composition is preferably 98% by mass or less, more preferably 95% by mass or less, and even more preferably 90% by mass or less.

In an aspect, the second radically polymerizable compound is preferably a radically polymerizable compound which contains two or more radically polymerizable groups in one molecule and does not have a urethane bond. The radically polymerizable group contained in the second radically polymerizable compound is preferably an ethylenically unsaturated group. In an aspect, the radically polymerizable group is preferably a vinyl group. In another aspect, the ethylenically unsaturated group is preferably a radically polymerizable group selected from the group consisting of an acryloyl group and a methacryloyl group. That is, it is preferable that the second radically polymerizable compound has one or more radically polymerizable groups selected from the group consisting of an acryloyl group and a methacryloyl group in one molecule and does not have a urethane bond. Furthermore, as a radically polymerizable compound, the second radically polymerizable compound can contain one or more radically polymerizable groups selected from the group consisting of an acryloyl group and a methacryloyl group and one or more radically polymerizable groups other than this in one molecule.

The number of radically polymerizable groups contained in one molecule of the second radically polymerizable compound is preferably at least 2, more preferably 3 or more, and even more preferably 4 or more. In an aspect, the number of radically polymerizable groups contained in one molecule of the second radically polymerizable compound is for example 10 or less, but may be more than 10. As the second radically polymerizable compound, a radically polymerizable compound having a molecular weight of 200 or more and less than 1000 is preferable.

The following compounds can be exemplified as the second radically polymerizable compound. However, the present invention is not limited to the following exemplary compounds.

Examples of the second radically polymerizable compound include bifunctional (meth)acrylate compounds such as polyethylene glycol 200 di(meth)acrylate, polyethylene glycol 300 di(meth)acrylate, polyethylene glycol 400 di(meth)acrylate, polyethylene glycol 600 di(meth)acrylate, triethylene glycol di(meth)acrylate, epichlorohydrin-modified ethylene glycol di(meth)acrylate (as a commercially available product, for example, DENACOL DA-811 manufactured by NAGASE & Co., LTD.), polypropylene glycol 200 di(meth)acrylate, polypropylene glycol 400 di(meth)acrylate, polypropylene glycol 700 di(meth)acrylate, ethylene oxide (EO)-propylene oxide (PO) block polyether di(meth)acrylate (as a commercially available product, for example, a BLEMMER PET series manufactured by NOF CORPORATION), dipropylene glycol di(meth)acrylate, bisphenol A EO addition-type di(meth)acrylate (as a commercially available product, for example, M-210 manufactured by TOAGOSEI CO., LTD. or NK ESTER A-BPE-20 manufactured by SHIN-NAKAMURA CHEMICAL CO., LTD.), hydrogenated bisphenol A EO addition-type di(meth)acrylate (such as NK ESTER A-HPE-4 manufactured by SHIN-NAKAMURA CHEMICAL CO., LTD.), bisphenol A PO-addition type di(meth)acrylate (as a commercially available product, for example, LIGHT ACRYLATE BP-TPA manufactured by KYOEISHA CHEMICAL Co., LTD.), bisphenol A epichlorohydrin addition-type di(meth)acrylate (as a commercially available product, for example, EBECRYL 150 manufactured by Daicel-UCB Company. Ltd.), bisphenol A EO.PO addition-type di(meth)acrylate (as a commercially available product, for example, BP-023-PE manufactured by TOHO Chemical Industry Co., Ltd.), bisphenol F EO addition-type di(meth)acrylate (as a commercially available product, for example, ARONIX M-208 manufactured by TOAGOSEI CO., LTD.), 1,6-hexanediol di(meth)acrylate, 1,6-hexanediol di(meth)acrylate modified with epichlorohydrin, neopentyl glycol di(meth)acrylate, hydroxypivalic acid neopentyl glycol di(meth)acrylate, hydroxypivalic acid neopentyl glycol di(meth)acrylate modified with caprolactone, 1,4-butanediol di(meth)acrylate, 1,9-nonanediol di(meth)acrylate, trimethylolpropane di(meth)acrylate, tricyclodecane dimethanol di(meth)acrylate, pentaerythritol di(meth)acrylate monostearate, trimethylolpropane acrylic acid-benzoic acid ester, and isocyanuric acid EO-modified di(meth)acrylate (as a commercially available product, for example, ARONIX M-215 manufactured by TOAGOSEI CO., LTD.).

Examples of the second radically polymerizable compound also include trifunctional (meth)acrylate compounds such as trimethylolpropane tri(meth)acrylate, trimethylolpropane tri(meth)acrylate modified with EO. PO, or epichlorohydrin, pentaerythritol tri(meth)acrylate, glycerol tri(meth)acrylate, glycerol tri(meth)acrylate modified with EO, PO, or epichlorohydrin, isocyanuric acid EO-modified tri(meth)acrylate (as a commercially available product, for example, ARONIX M-315 manufactured by TOAGOSEI CO., LTD.), tris(meth)acryloyloxyethyl phosphate, (2,2,2-tri-(meth)acryloyloxymethyl)ethyl hydrogen phthalate, glycerol tri(meth)acrylate, and glycerol tri(meth)acrylate modified with EO, PO, or epichlorohydrin: tetrafunctional (meth)acrylate compounds such as pentaerythritol tetra(meth)acrylate, pentaerythritol tetra(meth)acrylate modified with EO, PO, or epichlorohydrin, and ditrimethylolpropane tetra(meth)acrylate: pentafunctional (meth)acrylate compounds such as dipentaerythritol penta(meth)acrylate and dipentaerythritol penta(meth)acrylate modified with EO, PO, epichlorohydrin, fatty acid, or alkyl; and hexafunctional (meth)acrylate compounds such as dipentaetythritol hexa (meth)acrylate, dipentaerythritol hexa(meth)acrylate modified with EO, PO, epichlorohydrin, fatty acid, or alkyl, sorbitol hexa(meth)acrylate, and sorbitol hexa(me acrylate modified with EO, PC), epichlorohydrin, fatty acid, or alkyl.

Two or more kinds of second radically polymerizable compounds may be used in combination. In this case, a mixture "DPHA" (manufactured by Nippon Kayaku Co., Ltd) of dipentaerythritol pentaacrylate and dipentaerythritol hexaacrylate, and the like can be preferably used.

As the second radically polymerizable compound, polyester (meth)acrylate and epoxy (meth)acrylate having a weight-average molecular weight of 200 or more and less than 1000 are also preferable. Examples thereof include commercially available polyester (meth)acrvlate products such as a BEAMSET (trade name) 700 series, for example, BEAMSET 700 (hexafunctional), BEAMSET 710 (tetrafunctional), and BEAMSET 720 (trifunctional)) manufactured by Arakawa Chemical industries, Ltd. Examples of the epoxy (meth)acrylate include an SP series such as SP-1506, 500, SP-1507, and 480 (trade names) as well as a VR series such as VR-77 manufactured by Showa Highpolymer Co., Ltd., EA-1010/ECA, EA-11020, EA-1025, EA-6310/ECA (trade names) manufactured by SHIN-NAKAMURA CHEMICAL CO., LTD., and the like.

As specific examples of the second radically polymerizable compound, the following compounds can also be exemplified.

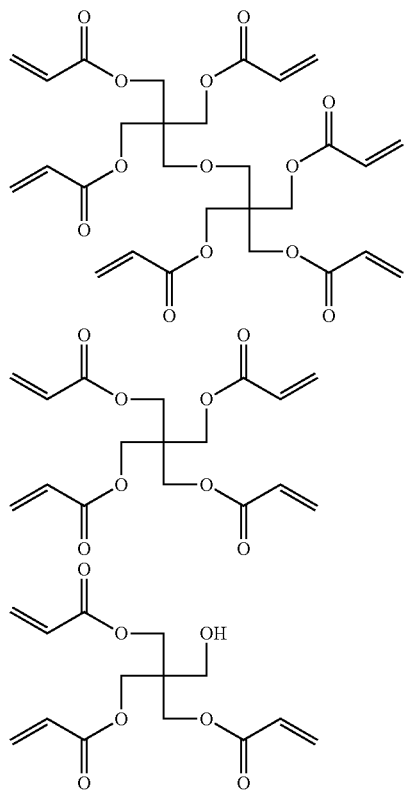

The curable composition for forming an HC layer of the second aspect (2), which is a preferable aspect of the second aspect, contains b) radically polymerizable compound containing three or more ethylenically unsaturated groups in one molecule. Hereinafter, b) compound containing three or more ethylenically unsaturated groups in one molecule will be also described as "b) component".

Examples of b) component include an ester of a polyhydric alcohol and (meth)acrylic acid, vinyl benzene and a derivative thereof, vinyl sulfone, (meth)acrylamide, and the like. Among these, a radically polymerizable compound containing three or more radically polymerizable groups selected from the group consisting of an acryloyl group and a methacryloyl group in one molecule is preferable. Specifically, examples thereof include a compound which is an ester of a polyhydric alcohol and (meth)acrylic acid and has three or more ethylenically unsaturated groups in one molecule. More specifically, examples thereof include (di)pentaetythritol tetra(meth)actylate, (di)pentaerythritol tri(meth)acrylate, trimethylolpropane tri(meth)acrylate, EO-modified trimethylolpropane tri(meth)acrylate, PO-modified trimethylolpropane tri(meth)acrylate, EO-modified phosphoric acid tri(meth)acrylate, trimethylolethane tri(meth)acrylate, ditrimethylolpropane tetra(meth)acrylate, dipentaerythritol tetra(meth)acrylate, (di)pentaerythritol penta(meth)acrylate, dipentaerythritol hexa(meth)acrylate, pentaerythritol hexa (meth)acrylate, 1,2,3-cyclohexanetetramethacrylate, polyurethane polyacrylate, polyester polyacrylate, caprolactone-modified tris(actyloxy ethyl)isocyanurate, tripentaerythritol triacrylate, tripentaerythritol hexatriacrylate, 1,2,4-cyclohexanetetra(meth)aclate, and pentaglycerol triacrylate. The term "(di)pentaerythritol" described above means either or both of pentaerythritol and dipentaerythritol.

Furthermore, a resin is also preferable which contains three or more radically polymerizable groups selected from the group consisting of an acryloyl group and a methacryloyl group in one molecule.

Examples of the resin containing three or more radically polymerizable groups selected from the group consisting of an acryloyl group and a methacryloyl group in one molecule include a polyester-based resin, a polyether-based resin, an acrylic resin, an epoxy-based resin, a urethane-based resin, an alkyd-based resin, a spiroacetal-based resin, a polybutadiene-based resin, a polythiol polyene-based resin, a polymer of a polyfunctional compound such as a polyhydric alcohol, and the like.

Specific examples of the radically polymerizable compound containing three or more radically polymerizable groups selected from the group consisting of an acryloyl group and a methacryloyl group in one molecule include exemplary compounds described in paragraph "0096" in JP2007-256844A, and the like.

Specific examples of the radically polymerizable compound containing three or more radically polymerizable groups selected from the group consisting of an acryloyl group and a methacryloyl group in one molecule include esterified substances of a polyol and (meth)acrylic acid such as KAYARAD DPHA, KAYARAD DPHA-2C, KAYARAD PET-30, KAYARAD TMPTA, KAYARAD TPA-320, KAYARAD TPA-330, KAYARAD RP-1040, KAYARAD T-1420, KAYARAD D-310, KAYARAD DPCA-20. KAYARAD DPCA-30, KAYARAD DPCA-60. and KAYARAD GPO-303 manufactured by Nippon Kayaku Co., Ltd., and V#400 and V#36095D manufactured by OSAKA ORGANIC CHEMICAL INDUSTRY LTD. Furthermore, it is also possible to suitably use urethane acrylate compounds having three or more functional groups such as SHIKOH UV-1400B, SHIKOH UV-1700B, SHIKOH U V-6300B, SHIKOH UV7550B, SHIKOH UV-7600B, SHIKOH UV-7605B, SHIKOH UV-7610B, SHIKOH UV-7620EA, SHIKOH UV-7630B, SHIKOH UV-7640B, SHIKOH UV-6630B, SHIKOH UV-7000B, SHIKOH UV-7510B, SHIKOH UV-74611E, SHIKOH UV-3000B, SHIKOH UV-3200B, SHIKOH UV-3210EA, SHIKOH UV-3310EA, SHIKOH UV-3310B, SHIKOH UV-3500BA, SHIKOH UV-352011, SHIKOH UV-3700B, SHIKOH UV-6100B, SHIKOH UV-6640B, SHIKOH UV-2000B, SHIKOH UV-2010B, SHIKOH UV-2250EA, and SHIKOH UV-2750B (manufactured by NIPPON GOHSEI), UL-503LN (manufactured by KYOEISHA CHEMICAL Co., LID), UNIDIC 17-806, UNIDIC 17-813, UNIDIC V-4030, and UNIDIC V-4000BA (manufactured by DIC Corporation), EB-1290K, EB-220, EB-5129, EB-1830, and EB-4358 (manufactured by Daicel-UCB Company, Ltd.), HI-COAP AU-2010 and HI-COAP AU-2020 (manufactured by TOKUSHIKI Co., Ltd.), ARONIX M-1960 (manufactured by TOAGOSEI CO., LTD.), and. ART RESIN UN-3320HA, UN-3320HC, UN-3320HS, UN-904, and HDP-4T, polyester compounds having three or more functional groups such as ARONIX M-8100, M-8030, and M-9050 (manufactured by TOAGOSEI CO., LTD.) and. KM/I-8307 (manufactured by Daicel SciTech), and the like.

As b) component, one kind of component may be used singly, or two or more kinds of components having different structures may be used in combination.

As described above, preferably, regarding the HC layer obtained by curing the curable composition for forming an HC layer of the second aspect (2), in a case where the total solid content of the HC layer is 100% by mass, the HC layer can contain a structure derived from a) in an amount of 15% to 70% by mass, a structure derived from b) in an amount of 25% to 80% by mass, c) in an amount of 0.1% to 10% by mass, and d) in an amount of 0.1% to 10% by mass. In a case where the total solid content of the HC layer is 100% by mass, the content of the structure derived from b) in the HC layer is preferably 40% to 75% by mass, and more preferably 60% to 75% by mass. Furthermore, in a case where the total solid content of the curable composition for forming an HC layer of the second aspect (2) is 100% by mass, the content of b) component in the composition is preferably 40% to 75% by mass, and more preferably 60% to 75% by mass.

—Canonically Polymerizable Compound—

It is preferable that the curable composition for forming an HC layer of the second aspect contains at least one kind of radically polymerizable compound and at least one kind of cationically polymerizable compound. Any of cationically polymerizable compounds can be used without limitation as long as the compounds have a polymerizable group which can be canonically polymerized (cationically polymerizable group). The number of canonically polymerizable groups contained in one molecule is at least 1. The cationically polymerizable compound may be a monofunctional compound containing one cationically polymerizable group or a polyfunctional compound containing two or more canonically polymerizable groups in one molecule. The number of cationically polymerizable groups contained in the polyfunctional compound is not particularly limited. For example, the polyfunctional compound contains 2 to 6 canonically polymerizable groups in one molecule. Furthermore, the polyfunctional compound may contain two or more kinds of cationically polymerizable groups, which are the same as each other or have different structures, in one molecule.

In addition, in an aspect, it is preferable that the canonically polymerizable compound has one or more radically polymerizable groups in one molecule together with the canonically polymerizable groups. Regarding the radically polymerizable group that the canonically polymerizable compound has, the above description for the radically polymerizable compound can be referred to. The radically polymerizable group is preferably an ethylenically unsaturated group, and the ethylenically unsaturated group is more preferably a radically polymerizable group selected from the group consisting of a vinyl group, an acryloyl group, and a methacryloyl group. The number of radically polymerizable groups in one molecule of the canonically polymerizable compound having a radically polymerizable group is at least 1, preferably 1 to 3, and more preferably 1.

As the cationically polymerizable group, an oxygen-containing heterocyclic group and a vinyl ether group can be preferably exemplified. The canonically polymerizable compound may contain one or more oxygen-containing heterocyclic groups and one or more vinyl ether groups in one molecule.

The oxygen-containing heterocyclic ring may be a monocyclic ring or a fused ring. Furthermore, it is also preferable that the oxygen-containing heterocyclic ring has a bicyclo skeleton. The oxygen-containing heterocyclic ring may be a non-aromatic ring or an aromatic ring, and is preferably a non-aromatic ring. Specific examples of the monocyclic ring include an epoxy ring, a tetrahydrofuran ring, and an oxetane ring. Examples of the oxygen-containing heterocyclic ring having a bicyclo skeleton include an oxabicyclo ring. The canonically polymerizable group containing the oxygen-containing heterocyclic ring is contained in the cationically polymerizable compound as a monovalent substituent or a polyvalent substituent with a valency of 2 or higher. The above-mentioned fused ring may be a ring formed by the condensation of two or more oxygen-containing heterocyclic rings or a ring formed by the condensation of one or more oxygen-containing heterocyclic rings and one or more ring structures other than the oxygen-containing heterocyclic ring. The ring structure other than the oxygen-containing heterocyclic ring is not limited to the above, and examples thereof include a cycloalkane ring such as a cyclohexane ring.

Specific examples of the oxygen-containing heterocyclic ring are shown below However, the present invention is not limited to the following specific examples.

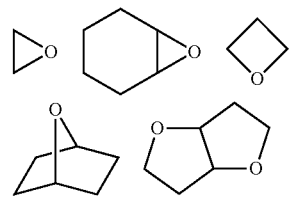

The cationically polymerizable compound may have a partial structure other than the cationically polymerizable group. The partial structure is not particularly limited, and may be a linear, branched, or cyclic structure. The partial structure may contain one or more heteroatoms such as oxygen atoms or nitrogen atoms.

As a preferable aspect of the cationically polymerizable compound, a compound (cyclic structure-containing compound) which has a cyclic structure can be exemplified as the cationically polymerizable group or as a partial structure other than the cationically polymerizable group. For example, the cyclic structure-containing compound may have one cyclic structure in one molecule, and may have two or more cyclic structures in one molecule. The number of cyclic structures contained in one molecule of the cyclic structure-containing compound is, for example, 1 to 5, but is not particularly limited. In a case where the compound contains two or more cyclic structures in one molecule, the cyclic structures may be the same as each other. Alternatively, the compound may contain two or more kinds of cyclic structures having different structures.

As an example of the cyclic structure contained in the cyclic structure-containing compound, an oxygen-containing heterocyclic ring can be exemplified. The details thereof are as described above.

A cationically polymerizable group equivalent obtained by dividing the molecular weight (hereinafter, referred to as "B") by the number of canonically polymerizable groups (hereinafter, referred to as "C") contained in one molecule of the cationically polymerizable compound (=B/C) is, for example, 300 or less, and from the viewpoint of improving the adhesiveness between the HC layer obtained by curing the curable composition for forming an HC layer and the resin film, the cationically polymerizable group equivalent is preferably less than 150. On the other hand, from the viewpoint of the hygroscopicity of the HC layer obtained by curing the curable composition for forming an HC layer, the cationically polymerizable group equivalent is preferably 50 or more. In addition, in an aspect, the canonically polymerizable group contained in the canonically polymerizable compound for which the cationically polymerizable group equivalent is obtained can be an epoxy group (epoxy ring). That is, in an aspect, the cationically polymerizable compound is an epoxy ring-containing compound. For the epoxy ring-containing compound, from the viewpoint of improving the adhesiveness between the HC layer obtained by curing the curable composition for forming an HC layer and the resin film, an epoxy group equivalent, which is obtained by dividing the molecular weight by the number of epoxy rings contained in one molecule, is preferably less than 150. The epoxy group equivalent of the epoxy ring-containing compound is 50 or more, for example.

The molecular weight of the cationically polymerizable compound is preferably 500 or less, and more preferably 300 or less. Presumably, the canonically polymerizable compound whose molecular weight is within the above range tends to easily permeate the resin film and can make a contribution to the improvement of the adhesiveness between the HC layer obtained by curing the curable composition for forming an HC layer and the resin film.

The curable composition for forming an HC layer of the second aspect (2) contains a) cationically polymerizable compound containing an alicyclic epoxy group and an ethylenically unsaturated group and having molecular weight of 300 or less, in which the number of alicyclic epoxy groups contained in one molecule is 1, and the number of ethylenically unsaturated groups contained in one molecule is 1. Hereinafter, a) will be referred to as "a) component".

Examples of the ethylenically unsaturated group include a radically polymerizable group including an acryloyl group, a methacryloyl group, a vinyl group, a styryl group, and an allyl group. Among these, an acryloyl group, a methacryloyl group, and $C(O)OCH=CH_2$ are preferable, and an acryloyl group and a methacryloyl group are more preferable. Each of the number of alicyclic epoxy groups in one molecule and the number of ethylenically unsaturated groups in one molecule is preferably 1.

The molecular weight of a) component is 300 or less, preferably 210 or less, and more preferably 200 or less.

As a preferable aspect of a) component, a compound represented by General Formula (1) can be exemplified.

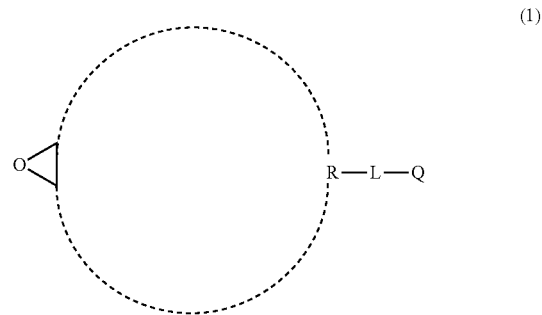

In General Formula (1), R represents monocyclic hydrocarbon or crosslinked hydrocarbon, L represents a single bond or a divalent linking group, and Q represents an ethylenically unsaturated group.

In a case where R in General Formula (1) is monocyclic hydrocarbon, the monocyclic hydrocarbon is preferably alicyclic hydrocarbon, more preferably an alicyclic group having 4 to 10 carbon atoms, even more preferably an alicyclic group having 5 to 7 carbon atoms, and particularly preferably an alicyclic group having 6 carbon atoms. Preferable specific examples thereof include a cyclobutyl group, a cyclopentyl group, a cyclohexyl group, and a cycloheptyl group. Among these, a cyclohexyl group is more preferable.

In a case where R in General Formula (1) is crosslinked hydrocarbon, the crosslinked hydrocarbon is preferably a bicyclic crosslinked hydrocarbon (bicyclo ring) or a tricyclic crosslinked hydrocarbon (tricyclo ring). Specific examples thereof include crosslinked hydrocarbon having 5 to 20 carbon atoms such as a norbornyl group, a bornyl group, an isobornyl group, a tricyclodecyl group, a dicyclopentenyl group, a dicyclopentanyl group, a tricyclopentenyl group, a tricyclopentanyl group, an adamantyl group, or a lower alkyl group (having 1 to 6 carbon atoms for example)-substituted adamantyl group.

In a case where L represents a divalent linking group, the divalent linking group is preferably a divalent aliphatic hydrocarbon group. The number of carbon atoms in the divalent aliphatic hydrocarbon group is preferably 1 to 6, more preferably 1 to 3, and even more preferably 1. As the divalent aliphatic hydrocarbon group, a linear, branched, or cyclic alkylene group is preferable, a linear or branched alkylene group is more preferable, and a linear alkylene group is even more preferable.

Examples of Q include an ethylenically unsaturated group including an acryloyl group, a methacryloyl group, a vinyl group, a styryl group, and an allyl group. Among these, an acryloyl group, a methacryloyl group, and $C(O)OCH=CH_2$ are preferable, and an acryloyl group and a methacryloyl group are more preferable.

Specific examples of a) component include various compounds exemplified in paragraph "0015" in JP1998-017614A (JP-I-110-017614A), and a compound represented by General Formula (1A) or (1B), 1,2-epoxy-4-vinylcyclohexane. Among these, the compound represented by General Formula (1A) or (1B) is more preferable. As the compound represented by General Formula (1A), an isomer thereof is also preferable.

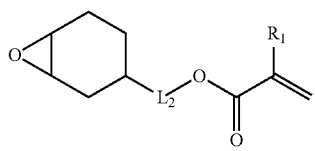

(1A)

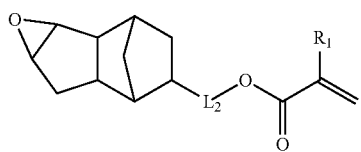

(1B)

In General Formulae (1A) and (1 B), $R_1$ represents a hydrogen atom or a methyl group, and $L_2$ represents a divalent aliphatic hydrocarbon group having 1 to 6 carbon atoms.

The number of carbon atoms in the divalent aliphatic hydrocarbon group represented by $L_2$ in General Formulae (1A) and (1B) is in a range of 1 to 6, more preferably in a range of 1 to 3, and even more preferably 1. As the divalent aliphatic hydrocarbon group, a linear, branched, or cyclic alkylene group is preferable, a linear or branched alkylene group is more preferable, and a linear alkylene group is even more preferable.

Regarding the BC layer obtained by curing the curable composition for forming an HC layer of the second aspect (2), in a case where the total solid content of the FTC layer is 100% by mass, the HC layer contains a structure derived from a) preferably in an amount of 15% to 70% o by mass, more preferably in an amount of 18% to 50% by mass, and even more preferably in an amount of 22% to 40% by mass. In addition, in a case where the total solid content of the curable composition for forming an HC layer of the second aspect (2) is 100% by mass, the composition contains a) component preferably in an amount of 15% to 70% by mass, more preferably in an amount of 18% to 50% by mass, and even more preferably in an amount of 22% to 40% by mass.

As another example of the cyclic structure contained in the cyclic structure-containing compound, a nitrogen-containing heterocyclic ring can be exemplified. The nitrogen-containing heterocyclic ring-containing compound is the canonically polymerizable compound which is preferable from the viewpoint of improving the adhesiveness between the HC layer obtained by curing the curable composition for forming an HC layer and the resin film. As the nitrogen-containing heterocyclic ring-containing compound, a compound which has one or more nitrogen-containing hetero-cyclic rings selected from the group consisting of an isocyanurate ring and a glycoluril ring in one molecule is preferable. Among these, from the viewpoint of improving the adhesiveness between the HC layer obtained by curing the curable composition for forming an HC layer and the resin film, the compound containing an isocyanurate ring (isocyanurate ring-containing compound) is more preferably a canonically polymerizable compound, The present inventors of the present invention assume that this is because the isocyanurate ring has excellent affinity with the resin constituting the resin film. In this respect, a resin film including an acrylic resin film is more preferable, and a resin film which includes an acrylic resin film having a surface as a surface directly contacting the HC layer obtained by curing the curable composition for forming an HC layer is more preferable.

As another example of the cyclic structure contained in the cyclic structure-containing compound, an alicyclic structure can be exemplified. Examples of the alicyclic structure include a cyclo ring structure, a dicyclo ring structure, and a tricyclo ring structure. Specific examples thereof include a dicyclopentanyl ring, and a cyclohexane ring.

The cationically polymerizable compound described so far can be synthesized by a known method, and can be obtained as a commercially available product.

Specific examples of the cationically polymerizable compound containing an oxygen-containing heterocyclic ring as a cationically polymerizable group include 3,4-epoxycyclo-hexylmethyl methacrylate (commercially available products such as CYCLOMER M100 manufactured by Daicel Corporation), 3,4-epoxycyclohexylmethyl-3',4'-epoxycyclo-hexane carboxylate (for example, commercially available products such as UVR 6105 and UVR 6110 manufactured by Union Carbide Corporation and CELLOXIDE 2021 manufactured by Daicel Corporation), bis(3,4-epoxycyclo-hexylmethyl)adipate (such as UVR 6128 manufactured by Union Carbide Corporation), vinylcyclohexene monoepoxide (such as CELLOXIDE 2000 manufactured by Daicel Corporation), ε-caprolactam-modified 3,4-epoxycyclohex-ylmethyl 3',4'-epoxycyclohexane carboxylate (such as CEL-LOXIDE 2081 manufactured by Daicel Corporation), 1-methyl-4-(2-methyloxiranyl)-7-oxabicyclo[4,1,0] heptane (such as CELLOXIDE 3000 manufactured by Daicel Corporation), 7,7'-dioxa-3,3'-bi[bicyclo[4.1.0]heptane] (such as CELLOXIDE 8000 manufactured by Daicel Corporation), 3-ethyl-3-hydroxymethyloxetane, 1,4 bis {[(3-ethyl-3-oxetanyl)methoxy]methyl}benzene, 3-ethyl-3-(phenoxym-ethyl)oxetane, 3-ethyl-3-(2-ethylhexyloxymethyl)oxetane, and di[1-ethyl(3-oxetanyl(]methyl ether.

Specific examples of the cationically polymerizable compound containing a vinyl ether group as a cationically polymerizable group include 1,4-butanediol divinyl ether, 1,6-hexanediol divinyl ether, nonanediol divinyl ether, cyclohexanediol divinyl ether, cyclohexane dimethanol divinyl ether, triethylene glycol divinyl ether, trimethylolpropane tri vinyl ether, and pentaerythritol tetravinyl ether. As the cationically polymerizable compound containing a vinyl ether group, those having an alicyclic structure are also preferable.

Further, as the canonically polymerizable compound, it is possible to use the compounds exemplified in JP1996-143806A (JP-1-H08-143806A), HP 996-283320A (JP-H08-283320A), JP2000-186079A, JP2000-327672A, JP2004-315778A, JP2005-029632A, and the like.

As specific examples of the canonically polymerizable compound, exemplary compounds are shown below, but the present invention is not limited to the following specific examples.

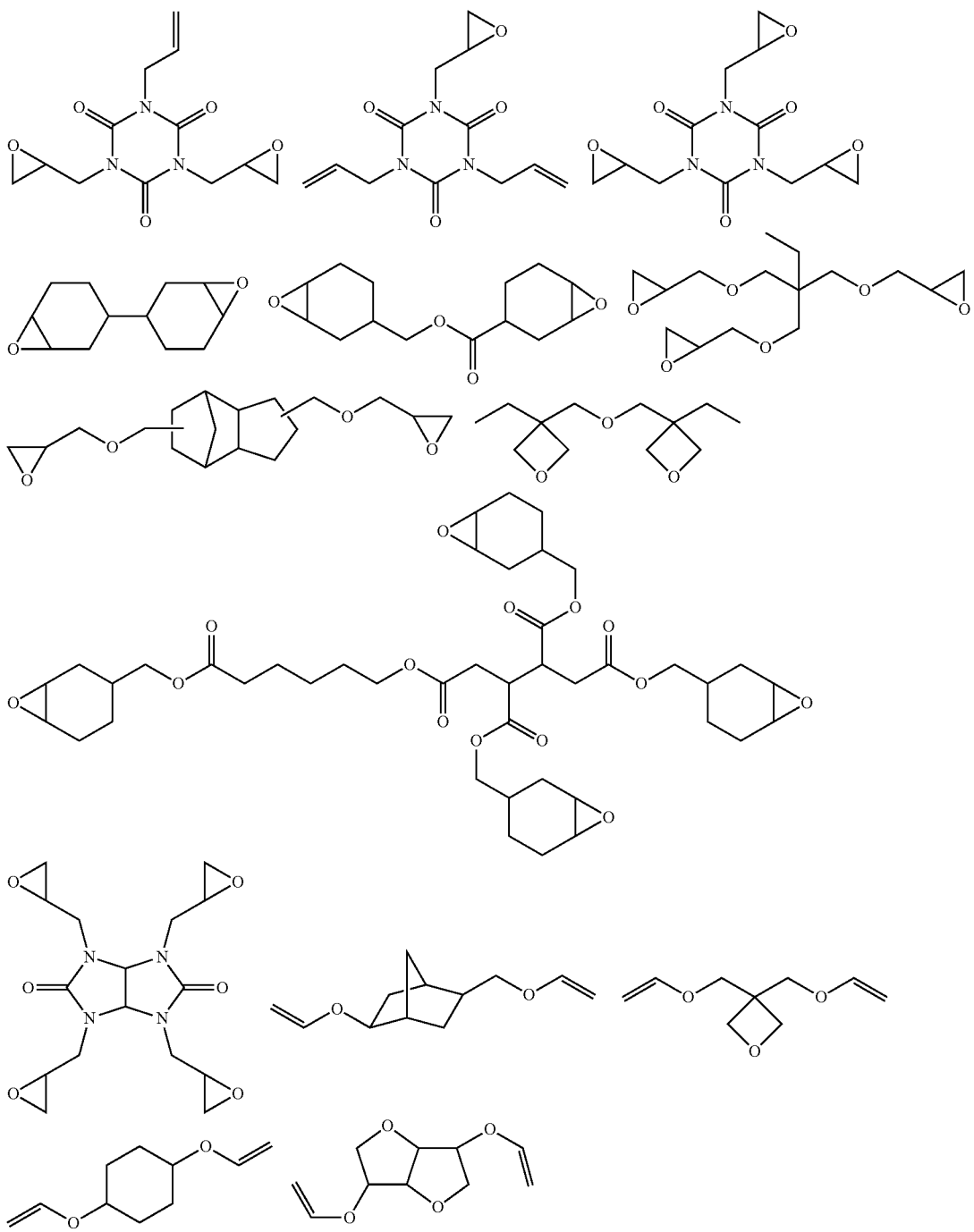

In addition, from the viewpoint of improving the adhesiveness between the HC layer obtained by curing the curable composition for forming an HC layer and the resin film, as preferable aspects of the curable composition for forming an HC layer, the following aspects can be exemplified. The curable composition for forming an HC layer more preferably satisfies one or more aspects among the following aspects, even more preferably satisfies two or more aspects, still more preferably satisfies three or more aspects, and yet more preferably satisfies all of the following aspects. It is preferable that one canonically polymerizable compound satisfies a plurality of aspects. For example, an aspect in which the canonically polymerizable group equivalent of the nitrogen-containing heterocyclic ring-containing compound is less than 150 is preferable.

(1) The curable composition for forming an HC layer contains a nitrogen-containing heterocyclic ring-containing compound as a canonically polymerizable compound. The nitrogen-containing heterocyclic ring contained in the nitrogen-containing heterocyclic ring-containing compound is preferably selected from the group consisting of an isocyanurate ring and a glycoluril ring. The nitrogen-containing heterocyclic ring-containing compound is more preferably an isocyanurate ring-containing compound. The isocyanurate ring-containing compound is even more preferably an epoxy ring-containing compound containing one or more epoxy rings in one molecule.

(2) The curable composition for forming an HC layer contains a cationically polymerizable compound having a cationically polymerizable group equivalent less than 150 as a canonically polymerizable compound. Preferably, the curable composition contains an epoxy group-containing compound having an epoxy group equivalent less than 150.

(3) The cationically polymerizable compound contains an ethylenically unsaturated group.

(4) The curable composition for forming an HC layer contains, as canonically polymerizable compounds, an oxetane ring-containing compound containing one or more oxetane rings in one molecule in addition to another canonically polymerizable compound. The oxetane ring-containing compound is preferably a compound which does not contain a nitrogen-containing heterocyclic ring.

The content of the canonically polymerizable compound in the curable composition for forming an HC layer with respect to the total content, 100 parts by mass, of the radically polymerizable compound and the canonically polymerizable compound is preferably 10 parts by mass or more, more preferably 15 parts by mass or more, and even more preferably 20 parts by mass or more. In addition, the content of the canonically polymerizable compound in the curable composition for forming an FTC layer with respect to the total content, 100 parts by mass, of the radically polymerizable compound and the canonically polymerizable compound is preferably 50 parts by mass or less.

The content of the cationically polymerizable compound in the curable composition for forming an HC layer with respect to the total content, 100 parts by mass, of the first radically polymerizable compound and the cationically polymerizable compound is preferably 0.05 parts by mass or more, more preferably 0.1 parts by mass or more, and even more preferably 1 part by mass or more. On the other hand, the content of the cationically polymerizable compound with respect to the total content, 100 parts by mass, of the first radically polymerizable compound and the canonically polymerizable compound is preferably 50 parts by mass or less, and more preferably 40 parts by mass or less.

In the present invention and the present specification, a compound having both the cationically polymerizable group and the radically polymerizable group is classified as a canonically polymerizable compound so as to specify the content thereof in the curable composition for forming an HC layer.

—Polymerization Initiator—

The curable composition for forming an HC layer preferably contains a polymerization initiator, and more preferably contains a photopolymerization initiator. The curable composition for forming an HC layer containing the radically polymerizable compound preferably contains a radical photopolymerization initiator, and the curable composition for forming an HC layer containing the canonically polymerizable compound preferably contains a cationic photopolymerization initiator. Only one kind of radical photopolymerization initiator or cationic photopolymerization initiator may be used, or two or more kinds of radical photopolymerization initiators or cationic photopolymerization initiators having different structures may be used in combination.

The content of the polymerization initiator in the curable composition for forming an HC layer may be appropriately adjusted in a range in which the polymerization reaction of the polymerizable compound is excellently carried out, and is not particularly limited. For example, the content of the polymerization initiator in the curable composition for forming an HC layer with respect to 100 parts by mass of the polymerizable compound is in a range of 0.1 to 20 parts by mass, preferably in a range of 0.5 to 10 parts by mass, and more preferably in a range of 1 to 10 parts by mass.

—Components Which Can be Optionally Incorporated Into Curable Composition for Forming HC Layer—

The curable composition for forming an HC layer contains at least one kind of component having a property of being cured by irradiation with active energy rays and can optionally contain at least one kind of polymerization initiator. It is preferable that the composition contains the polymerization initiator. The details of the polymerization initiator are as described above.

Next, each of the components that can be optionally incorporated into the curable composition for forming an HC layer will be described.

(i) Inorganic Particles

The curable composition for forming an HC layer can contain inorganic panicles having an average primary particle diameter less than 2 μm. The average primary particle diameter of the inorganic particles is preferably in a range of 10 nm to 1 μm, more preferably in a range of 10 nm to 100 nm, and even more preferably in a range of 10 nm to 50 nm.

For the average primary particle diameter of the inorganic particles and man particles which will be described later, the particles are observed using a transmission electron microscope (at a magnification of 500000 times to 2000000 times), randomly selected 100 particles (primary particles) are observed, and the average of the particle diameters thereof is taken as the average primary particle diameter.

Examples of the inorganic particles include silica particles, titanium dioxide particles, zirconium oxide particles, and aluminum oxide particles. Among these, silica particles are preferable.

In order to improve the affinity of the inorganic particles with organic components contained in the curable composition for forming an HC layer, the surface of the inorganic particles may be treated with a surface modifier including an organic segment. It is preferable that the surface modifier has a functional group, which can form a bond with the inorganic particles or can be adsorbed onto the inorganic particles, and a functional group, which has high affinity with an organic component, in the same molecule. As the surface modifier having a functional group which can form a bond with the inorganic particles or can be adsorbed onto the inorganic particles, a silane-based surface modifier, a metal alkoxide surface modifier such as aluminum, titanium, and zirconium, or a surface modifier having an anionic group such as a phosphoric acid group, a sulfuric acid group, a sulfonic acid group, or a carboxylic acid group is preferable. Examples of the functional group having high affinity with an organic component include a functional group having the same hydrophilicity and hydrophobicity as those of the organic component, and a functional group which can be chemically bonded to the organic component. Among these, the functional group which can be chemically bonded to the organic component and the like are preferable, and an ethylenically unsaturated group or a ring-opening polymerizable group is more preferable.

As a preferable inorganic particle surface modifier, a metal alkoxide surface modifier or a polymerizable compound, which has an anionic group and an ethylenically unsaturated group or a ring-opening polymerizable group in the same molecule is used. By chemically bonding the inorganic particles and the organic components to each other by using these surface modifiers, the crosslinking density of the HC layer can be increased. As a result, the hardness of the front plate (and the hardness of a liquid crystal panel including the front plate) can be improved.

Specific examples of the surface modifier include the following exemplary compounds S-1 to S-8.

S-1 $H_2C=C(X)COOC_3H_6Si(OCH_3)_3$
S-2 $H_2C=C(X)COOC_2H_4OTi(OC_2H_5)_3$
S-3 $H_2C=C(X)COOC_2H_4OCOC_5H_{10}OPO(OH)_2$
S-4 $(H_2C=C(X)COOC_2H_4OCOC_5H_{10}O)2_pOOH$
S-5$H_2C=C(X)COOC_2H_4OSO_3H$
S-6$H_2C=C(X)COO(C_5H_{10}COO)_2H$
S-7$H_2C=C(X)COOC_5H_{10}COOH$
S-8$CH_2CH(O)CH_2OC_3H_6Si(OCH_3)_3$ (X represents a hydrogen atom or a methyl group.)

It is preferable that the surface modification for the inorganic particles by the surface modifier is performed in a solution. The surface modification may be performed by a method in which a surface modifier is allowed to coexist at the time of mechanically dispersing the inorganic particles, a method in Which the inorganic particles are mechanically dispersed and then a surface modifier is added thereto and stirred, or a method in which the surface modification is performed before the inorganic particles are mechanically dispersed (if necessary, the inorganic particles are warmed and dried and then subjected to heating or changing of power of hydrogen (pH)) and then the inorganic particles are dispersed. As a solvent for dissolving the surface modifier, an organic solvent having high polarity is preferable. Specific examples thereof include known solvents such as an alcohol, a ketone, and an ester.

In a case where the total solid content of the curable composition for forming an HC layer is 100% by mass, the content of the inorganic particles is preferably 5% to 40% by mass and more preferably 10% to 30% by mass. It does not matter whether the primary particles of the inorganic particles have a spherical shape or a non-spherical shape. However, it is preferable that the primary particles of the inorganic particles have a spherical shape. From the viewpoint of further improving the hardness, it is more preferable that in the FIC layer obtained by curing the curable composition for forming an HC layer, the inorganic particles are present as non-spherical high order particles of the order equal to or higher than that of secondary particles in which 2 to 10 spherical inorganic particles (primary particles) are linked to each other.

Specific examples of the inorganic particles include ELCOM V-8802 (spherical silica particles having an average primary particle diameter of 15 nm manufactured by JGC CORPORATION), ELCOM V-8803 (silica particles of irregular shapes manufactured by JGC CORPORATION), MiBK-SD (spherical silica particles having an average primary particle diameter of 10 to 20 nm manufactured by NISSAN CHEMICAL INDUSTRIES, LTD.), MEK-AC-2140Z (spherical silica particles having an average primary particle diameter of 10 to 20 nm manufactured by NISSAN CHEMICAL INDUSTRIES, LTD.), MEI-AC-4130 (spherical silica particles having an average primary particle diameter of 45 nm manufactured by NISSAN CHEMICAL INDUSTRIES, LTD.), MiBK-SD-L (spherical silica particles having an average primary particle diameter of 40 to 50 nm manufactured by NISSAN CHEMICAL INDUSTRIES, LTD.), and MEK-AC-5140Z (spherical silica particles having an average primary particle diameter of 85 nm manufactured by NISSAN CHEMICAL INDUSTRIES, LTD.). Among these, from the viewpoint of further improving hardness, ELCOM V-8802 manufactured by JGC CORPORATION is preferable, (ii) Matt Particles The curable composition for forming an HC layer can also contain matt particles. The matt particles mean particles having an average primary particle diameter of 2 µm or more. The matt particles may be inorganic particles or organic particles, or may be panicles of an inorganic-organic composite material. It does not matter whether the matt particles have a spherical shape or a non-spherical shape. The average primary particle diameter of the matt particles is preferably in a range of 2 to 20 µm, more preferably in a range of 4 to 14 µm, and even more preferably in a range of 6 to 10 µm.

Specific examples of the matt particles include inorganic particles such as silica particles and $TiO_2$ particles and organic particles such as crosslinked acryl particles, crosslinked acryl-styrene particles, crosslinked styrene particles, melamine resin particles, and benzoguanamine resin particles. Among these, organic particles are preferable as the matt particles, and crosslinked acryl particles, crosslinked acryl-styrene particles, or crosslinked styrene particles are more preferable.

The content of the matt particles per unit volume of the HC layer obtained by curing the curable composition for forming an HC layer is preferably 0.10 $g/cm^3$ or more, more preferably 0.10 $g/cm^3$ to 0.40 $g/cm^3$, and even more preferably 0.10 $g/cm^3$ to 0.30 $g/cm^3$.

(iii) Ultraviolet Absorber

It is also preferable that the curable composition for forming an HC layer contains an ultraviolet absorber. Examples of the ultraviolet absorber include a benzotriazole compound and a triazine compound. The benzotriazole compound mentioned herein is a compound having a benzotriazole ring, and specific examples thereof include various benzotriazole-based ultraviolet absorbers described in paragraph 0033 in JP2013-111835A. The triazine compound is a compound having a triazine ring, and specific examples thereof include various triazine-based ultraviolet absorbers described in paragraph 0033 in JP2013-111835A. The content of the ultraviolet absorber in the HC layer is, for example, about 0.1 to 10 parts by mass with respect to 100 parts by mass of the resin contained in the HC layer, but is not particularly limited. Regarding the ultraviolet absorber, paragraph 0032 in JP 013-111835A can also be referred to. In the present invention and the present specification, the ultraviolet rays mean the light having a central emission wavelength in a wavelength range of 200 to 380 nm.

(iv) Fluorine-Containing Compound

It is also preferable that the curable composition for forming an HC layer contains a fluorine-containing compound such as a leveling agent or an antifouling agent.

As the leveling agent, a fluorine-containing polymer is preferably used. Examples thereof include the fluoroaliphatic group-containing polymer described. in JP5175831B. Furthermore, a fluoroaliphatic group-containing polymer, in which the content of a fluoroaliphatic group-containing monomer represented by General Formula (1) constituting the fluoroaliphatic group-containing polymer is 50% by mass or less with respect to all polymerization units, can also be used as a leveling agent.

In a case where the HC layer contains an antifouling agent, the adhesion of fingerprints and dirt can be reduced, and the attached dirt can be easily wiped off. In addition, by improving the surface slipperiness, it is possible to further improve the rub resistance.

The antifouling agent preferably contains a fluorine-containing compound. The fluorine-containing compound preferably has a perfluoropolyether group and a polymerizable group (preferably a radically polymerizable group). It is more preferable that the fluorine-containing compound has a perfluoropolyether group and a polymerizable group and has a plurality of polymerizable groups in one molecule. By adopting such a constitution, the effect of improving the rub resistance can be more effectively exhibited.

In addition, in the present specification, even in a case where the antifouling agent has a polymerizable group, the antifouling agent is not applicable to polymerizable compounds 1 to 3 and the other polymerizable compounds.

The fluorine-containing compound may be any of a monomer, an oligomer, or a polymer. However, the fluorine-containing compound is preferably an oligomer (fluorine-containing oligomer).

The curable composition for forming an HC layer can also contain the leveling agent and the antifouling agent described in (vi) Other components, which will be described later, in addition to the above components.

As the antifouling agent that can be used in the present invention, in addition to the above materials, the materials described in paragraphs 0012 to 0101 of JP2012-088699A can be used, and the content of the publication is incorporated in the present specification.

As the antifouling agent described above, antifouling agents synthesized by known methods may be used and commercially available products may be used. As commercially available products, RS-90 and RS-78 manufactured by DIC Corporation, and the like can be preferably used.

In a case where the curable composition for forming an HC layer contains the fluorine-containing compound, the content of the fluorine-containing compound is preferably 0.01% to 10% by mass, more preferably 0.05% to 5% by mass, and even more preferably 0.1% to 2% by mass with respect to the solid content of the curable composition for forming an HC layer.

The curable composition for forming an HC layer may contain one kinds of antifouling agent or may contain two or more kinds of antifouling agents. In a case where the curable composition contains two or more kinds of antifouling agents, the total amount is preferably in the above range.

In addition, the curable composition for forming an HC layer may not substantially contain the antifouling agent.

(v) Solvent

It is preferable that the curable composition for forming an HC layer contains a solvent. As the solvent, an organic solvent is preferable. One kind of organic solvent can be used, or two or more kinds of organic solvents can be used by being mixed together at any ratio. Specific examples of the organic solvent include alcohols such as methanol, ethanol, propanol, n-butanol, and i-butanol; ketones such as acetone, methyl isobutyl ketone, methyl ethyl ketone, and cyclohexanone; cellosolves such as ethyl cellosolve; aromatic solvents such as toluene and xylene; glycol ethers such as propylene glycol monomethyl ether; acetic acid esters such as methyl acetate, ethyl acetate, and butyl acetate; and &acetone alcohol. Among these, cyclohexanone, methyl ethyl ketone, methyl isobutyl ketone, and methyl acetate are preferable, and a mixture of cyclohexanone, methyl ethyl ketone, methyl isobutyl ketone, and methyl acetate which are mixed at any ratio is more preferably used. In a case where the above constitution is adopted, an antireflection laminate having better rub resistance, punching properties, and adhesiveness is obtained.

The amount of the solvent in the curable composition for forming an HC layer can be appropriately adjusted within a range in which coating suitability of the composition can be secured. For example, the content of the solvent with respect to the total amount, 100 parts by mass, of the polymerizable compound and the photopolymerization initiator can be 50 to 500 parts by mass, and preferably 80 to 200 parts by mass.

The solid content in the curable composition for forming an HC layer is preferably 10% to 90% by mass, more preferably 50% to 80% by mass, and particularly preferably 65% to 75% by mass.

(vi) Other Components

The curable composition for forming an HC layer can contain one or more kinds of known additives in any amount, in addition to the above components. Examples of the additives include a surface conditioner, a leveling agent, a polymerization inhibitor, polyrotaxane, and the like. For the details of these, paragraphs 0032 to 0034 in JP2012-229412A can be referred to. In addition, commercially available antifouling agents or antifouling agents that can be prepared by known methods can also be contained. However, the additives are not limited to these, and various additives generally added to the curable composition for forming an HC layer can be used.

The curable composition for forming an HC layer can be prepared by simultaneously mixing together the various components described above or by sequentially mixing the components together in an arbitrary order. The preparation method is not particularly limited, and a known stirrer or the like can be used for preparation.

2) Laminated Structure Including Two or More Layers

The laminate preferably has an aspect in which the HC layer 1A in FIG. 1 has at least a first HC layer and a second HC layer in this order from the resin film 2A side.

The first HC layer may be positioned on the surface of the resin film 2A, or there may be another layer between the resin film 2A and the first HC layer. Similarly, the second HC layer may be positioned on the surface of the first HC layer, or there may be another layer between the first HC layer and the second HC layer. From the viewpoint of improving the adhesiveness between the first HC layer and the second HC layer, it is preferable that the second HC layer is positioned on the surface of the first HC layer, that is, the first and second HC layers are in contact with each other in at least a portion within the film surface.

Each of the first HC layer and the second HC layer may be constituted of one layer or two or more layers, and is preferably constituted of one layer.

Further, in a case where the antireflection laminate according to the embodiment of the present invention is used in a touch panel as will be specifically described later, it is preferable that the antireflection laminate is arranged such that the second HC layer becomes the front surface side of the image display element. However, in order to improve the rub resistance and the punching properties of the surface of the antireflection laminate, it is preferable that the second HC layer is arranged on the surface side, particularly, on the uppermost surface of the antireflection laminate.

<First HC Layer and Curable Composition for Forming First HC Layer>

The first HC layer used in the present invention is formed of a curable composition for forming a first HC layer.

It is preferable that the curable composition for forming a first HC layer contains a polymerizable compound 1 having a radically polymerizable group and a polymerizable compound 2 which has a canonically polymerizable group and a radically polymerizable group in the same molecule and is different from the polymerizable compound 1. The content of the polymerizable compound 2 in the polymerizable compounds contained in the curable composition for forming a first HC layer is 51% by mass or more.

(Polymerizable Compound)

As the polymerizable compound 1, the description of the above-mentioned radically polymerizable compound is preferably adopted, and as the polymerizable compound 2, the description of a) component in the above-mentioned canonically polymerizable compound is preferably applied.

The curable composition for forming a first HC layer may have another polymerizable compound different from the polymerizable compound 1 and the polymerizable compound 2.

Another polymerizable compound described above is preferably a polymerizable compound having a canonically polymerizable group. The canonically polymerizable group has the same definition as the canonically polymerizable group described above regarding the a) component of the polymerizable compound 2, and the preferable range thereof is also the same. Particularly, in the present invention, as another polymerizable compound, a nitrogen-containing heterocyclic ring-containing compound containing a canonically polymerizable group is preferable. In a case where such a compound is used, the adhesiveness between the resin film and the first HC layer can be more effectively improved. Examples of the nitrogen-containing heterocyclic ring include a nitrogen-containing heterocyclic ring selected from the group consisting of isocyanurate rings and glycoluril rings, and an isocyanurate ring is more preferable. The number of cationic groups contained in another polymerizable compound described above is preferably 1 to 10, and more preferably 2 to 5. In a case where a polymerizable compound having a canonically polymerizable group and a nitrogen-containing heterocyclic ring structure is used as another polymerizable compound described above, as the resin film, a resin film including an acrylic resin film is preferable. In a case where this constitution is adopted, the adhesiveness between the resin film and the first HC layer tends to be further improved.

Specific examples of another polymerizable compound include the above-mentioned exemplary compounds, but the present invention is not limited to the above-mentioned specific examples.

<Second HC layer and Composition for Forming Second I-IC Layer>

The second HC layer is formed of a curable composition for forming a second HC layer.

The curable composition for forming a second HC layer contains 90% by mass or more of a polymerizable compound 3 having a radically polymerizable group. As the polymerizable compound 3, the above-mentioned description of the radically polymerizable compound is preferably applied.

(Others)

In addition, the description of the polymerization initiator, the inorganic particles, the matt particles, the ultraviolet absorber, the fluorine-containing compound, the solvent, and other components described above can also be preferably applied.

Particularly, in the aspect in which the first HC layer and the second HC layer are arranged in this order from the resin film 2A side in the HC layer 1A, the curable composition for forming a first HC layer preferably contains a solvent, and the curable composition for forming a second HC layer preferably contains an antifouling agent.

(Thickness of HC Layer)

From the viewpoint of reducing keyboard reflection by suppressing the deformation of the film, the thickness of the HC layer is preferably 5 μm or more and more preferably 10 μm or more. In addition, from the viewpoint of suppressing curling generated by volume shrinkage during HC layer formation, the thickness of the HC layer is preferably 40 μm or less and more preferably 30 μm or less.

—Method of Forming HC Layer—

By applying the curable composition for forming an HC layer to the resin film directly or through another layer such as an easily adhesive layer and irradiating the composition with active energy rays, the HC layer can be formed. The curable composition can be applied by known coating methods such as a dip coating method, an air knife coating method, a curtain coating method, a roller coating method, a die coating method, a wire bar coating method, and a gravure coating method. By simultaneously or sequentially applying two or more kinds of compositions having different compositions to the resin film, an HC layer having a laminated structure including two or more layers (for example, about two to five layers) can also be formed.

By irradiating the applied curable composition for forming an HC layer with active energy rays, the HC layer can be formed. For example, in a case where the curable composition for forming an HC layer contains a radically polymizable compound, a canonically polymerizable compound, a radical photopolymerization initiator, and a cationic photopolymerization initiator, a polymerization reaction between the radically polymerizable compound and the canonically polymerizable compound can be initiated and proceed by the action of a radical photopolymerization initiator and a cationic photopolymerization initiator respectively. The wavelength of radiated light may be determined according to the type of the polymerizable compound and the polymerization initiator used. Examples of light sources for light irradiation include a high-pressure mercury lamp, an ultrahigh-pressure mercury lamp, a carbon arc lamp, a metal halide lamp, a xenon lamp, a chemical lamp, an electrodeless discharge lamp, a light emitting diode (LED), and the like, which emit light in a wavelength range of 150 to 450 nm. The light irradiation amount is generally in a range of 30 to 3000 mJ/cm$^2$, and preferably in a range of 100 to 1500 mJ/cm$^2$. If necessary, a drying treatment may be performed before or after the light irradiation or before and after the light irradiation. The drying treatment can be performed by hot air blowing, arranging the resin film with the composition in a heating furnace, or transporting the resin film with the composition in a heating furnace, and the like. In a case where the curable composition for forming an HC layer contains a solvent, the heating temperature may be set to a temperature at which the solvent can be dried and removed, but the heating temperature is not particularly limited. Herein, the heating temperature means the temperature of hot air or the internal atmospheric temperature of the heating furnace.

(4) Inorganic Oxide Layer (AR Layer)

The laminate according to the embodiment of the present invention may further have an inorganic oxide layer (AR layer), and for example, an aspect in which an inorganic oxide layer (AR layer) is provided on the surface of the hard coat layer opposite to the surface having the support thereon may be exemplified.

Figure 2:
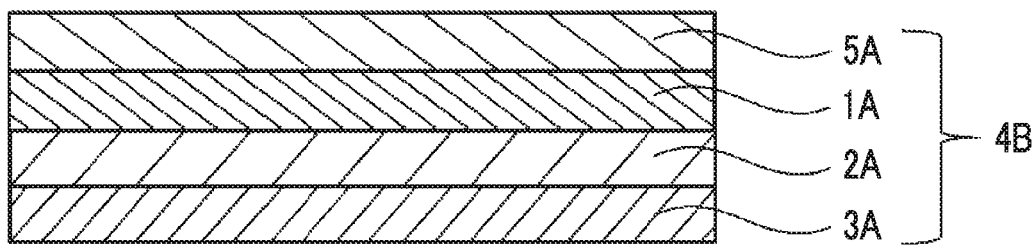
FIG. 2 is a schematic cross-sectional view showing an embodiment of a configuration of a laminate having an inorganic oxide layer according to the present invention.

As an aspect of the laminate having an AR layer, as shown in FIG. 2, a laminate 4B according to the embodiment of the present invention having a constitution in which an AR layer 5A, the HC layer 1A, the resin film 2A, and the shock absorbing layer 3A are laminated in this order may be exemplified.

The AR layer in the laminate according to the embodiment of the present invention has a layer having a function as an antireflection layer, and for example, the AR layer can be formed by dry coating methods such as a sputtering method, a reactive sputtering method, a vapor deposition method, an ion plating method, and a chemical vapor deposition (CVD) method. Since the film thickness is highly uniform and there are few defects such as pinholes, it is preferable to use a sputtering method capable of forming a thin film that is excellent in visibility, dense, and excellent mechanical properties such as scratch resistance. Among these, since higher productivity can be achieved due to a higher film formation rate and high discharge stability, a dual magnetron sputtering (DMS) method in which film formation is performed by applying a voltage in the middle frequency region is optimal.

In a case of adopting a sputtering method, the pressure at the time of lamination of the AR layer is preferably 0.1 to 0.6 Pa. The reason is that a sufficient sputtering rate and film density can be obtained.

The AR layer may be any of a layer of high refractive index and a layer of low refractive index, and may have a single layer or a plurality of layers.

In a case where the AR layer is a multilayer, the AR layer is preferably a layer in which a layer of high refractive index and a layer of low refractive index are alternately laminated, and the outer layer of the AR layer (that is, the layer arranged on the opposite side to the HC layer) is preferably a layer of low refractive index. Among these, the AR layer is a laminate of four or more layers in which a layer of high refractive index and a layer of low refractive index layer are alternately laminated, and the outer layer of the AR layer is preferably a layer of low refractive index and the innermost layer of the AR layer (that is, the layer arranged closest to the HC layer) is more preferably a layer of high refractive index.

As a material constituting a layer of high refractive index, metals such as indium, tin, titanium, zinc, zirconium, niobium, magnesium, bismuth, cerium, tantalum, aluminum, germanium, potassium, antimony, neodymium, lanthanum, thorium, and hafnium, and alloys of two or more kinds of these metals, and oxides, fluorides, sulfides and nitrides thereof. Specific examples include titanium oxide, niobium oxide, zirconium oxide, tantalum oxide, zinc oxide, indium oxide, and cerium oxide, but are not limited thereto. In addition, in a case where a plurality of layers are layered, it is not always necessary to select the same material, and the material may be appropriately selected according to the purpose. Among these, in a case where a sputtering method is used, niobium oxide is suitable because the number of pinholes in the prepared thin film is small.

Examples of materials constituting the layer of low refractive index include materials such as silicon oxide, magnesium fluoride, barium fluoride, calcium fluoride, hafnium fluoride, and lanthanum fluoride, but the material is not limited thereto. In addition, in a case where a plurality of layers are laminated, it is not always necessary to select the same material, and the material may be appropriately selected according to the purpose. Particularly, silicon oxide is the optimal material from the viewpoints of optical properties, mechanical strength, cost, and film formation suitability. The silicon oxide ($SiO_x$) here mainly refers to silicon dioxide ($SiO_2$). However, due to the oxygen deficiency and/or increase, the x of $SiO_x$ changes in a range of 1.8 to 2.2.

The total film thickness of the AR layer is preferably 100 to 300 nm. From the viewpoint of obtaining sufficient reflection performance, the total film thickness is preferably equal to or more than the lower limit value and is preferably equal to less the upper limit value from the viewpoint of productivity.

(5) Other Layers

The laminate according to the embodiment of the present invention may have, if necessary, an antifouling layer and a pressure sensitive adhesive layer, in addition to the resin film, the shock absorbing layer, the HC layer, and the AR layer.

(Antifouling Layer)

The laminate according to the embodiment of the present invention may have an antifouling layer on the outermost layer of the AR layer. The antifouling layer is preferably a layer containing a fluorine compound formed by a vacuum deposition method and more preferably a layer formed of a fluorine-containing silicon compound having two or more silicon atoms bonded to a reactive functional group. Here, the reactive functional group is a group which can react with and be bonded to the outermost layer of the AR layer. In addition, it is also preferable that the antifouling layer is formed by using a fluorine-containing silicon compound having a reactive functional group and reacting the reactive functional groups with each other.

By providing the antifouling layer, dirt is not easily attached, and further, the wiping performance in a case where dirt is attached cam be improved. Here, the method of forming the antifouling layer is not particularly limited, but a vacuum deposition method is preferable as film formation method. According to the method, in a case where the film formation is continuously performed, it is possible to form a film with good film thickness uniformity.

In this case, in order to impart sufficient antifouling performance, the water droplet contact angle is preferably at least 100° or more. Thus, the dirt wiping properties of the surface can be improved. Further, since the friction coefficient also decreases, the scratch resistance performance can also be further improved. In addition, from the viewpoint of scratch resistance, it is particularly preferable that the antifouling layer is not scratched even after being rubbed 10 reciprocations using a steel wool #0000 under an environment at a temperature of 25° C. and a relative humidity 55% with a load of 1.5 kg/cm².

[Article Including Laminate]

As an article including the laminate according to the embodiment of the present invention, in various industries including home appliance industry, electrical and electronic industry, automobile industry, and housing industry, various articles capable of achieving suppression of transfer of the shape of another object to the hard coat layer (for example, suppress keyboard reflection) may be exemplified. Specific examples include image display devices such as a notebook PC, a touch sensor, a touch panel, and a liquid crystal display, an automotive window glass, and a residential window glass. By providing the laminate according to the embodiment of the present invention to these articles, it is possible to provide an article in which transfer of the shape of another object to the hard coat layer (for example, keyboard reflection) is sufficiently suppressed. In addition, in a case of using the laminate having the AR layer, the antireflection function can also be imparted. The laminate according to the embodiment of the present invention is preferably used as a laminate that can be used as a protective film, a polarizing plate, or a front plate of an image display device, and more preferably used as a laminate that can be used as a protective film, a polarizing plate or a front plate of an image display element of a notebook PC.

The notebook PC in which the laminate according to the embodiment of the present invention can be used is not particularly limited and can be appropriately selected depending on the purpose.

<<Image Display Device>>

An image display device having the laminate according to the embodiment of the present invention includes the protective film, the polarizing plate, or the front plate having the laminate according to the embodiment of the present invention, and an image display element.

As the image display device, it is possible to use image display apparatuses such as a liquid crystal display (LCD), a plasma display panel, an electroluminescence display, a cathode tube display, and a touch panel.

Examples of the liquid crystal display include a twisted nematic (TN) type, a super-twisted nematic (STN) type, a triple super twisted nematic (TSTN) type, a multi domain type, a vertical alignment (VA) type, an in plane switching (IPS) type, and an optically compensated bend (OCB) type.

It is preferable that the image display device has ameliorated brittleness and excellent handleability, does not impair display quality by surface smoothness or wrinkles, and can suppress the leakage of light at the time of a moisture-heat test.

That is, it is preferable that the image display device having the laminate according to the embodiment of the present invention includes a liquid crystal display as an image display element. Examples of the image display device having a liquid crystal display include Xperia P manufactured by Sony Ericsson Mobile, and the like.

<<Polarizing Plate>>

In a polarizing plate according to an embodiment of the present invention, the laminate according to the embodiment of the present invention has a polarizer. In the laminate according to the embodiment of the present invention, the shock absorbing layer, the support, and the hard coat layer may be arranged in this order and the surface of the shock absorbing layer opposite to the surface having the support may have a polarizer Alternatively, the shock absorbing layer, the support, and the hard coat layer may be arranged in this order and the surface of the hard coat layer opposite to the surface having the support may have a polarizer.

More specifically, the laminate according to the embodiment of the present invention can be used as either or both of the protective films of the polarizing plate including the polarizer and the protective films arranged on both sides thereof. By using the laminate according to the embodiment of the present invention, a polarizing plate in which the keyboard reflection accompanying load is sufficiently suppressed can be provided. In addition, in a case of using the laminate having the AR layer, an antireflection function can be imparted.

<<Position Where Shock Absorbing Layer is Provided>>

In the image display device having the laminate according to the embodiment of the present invention, the position where the shock absorbing layer is provided is not particularly limited and for example, the following aspects may be adopted.

Functional layer/support/shock absorbing layer

Functional layer/support/shock absorbing layer/protective film

Functional layer/support/shock absorbing layer/protective film/polarizer/protective film Functional layer/support/shock absorbing layer/polarizer/protective film Functional layer/support/polarizer/shock absorbing layer/protective film Functional layer/support/polarizer/protective film/shock absorbing layer Functional layer/support/shock absorbing layer/pressure sensitive adhesive/protective film/polarizer/protective film Functional layer/support/polarizer/protective film/pressure sensitive adhesive/shock absorbing layer Functional layer/support/phase difference film/shock absorbing layer Functional layer/support/phase difference film/pressure sensitive adhesive/shock absorbing layer Functional layer/support/phase difference film/shock absorbing layer/protective film Functional layer/support/phase difference film/shock absorbing layer/protective film/polarizer/protective film Functional layer/support/phase difference film/pressure sensitive adhesive/protective film/shock absorbing layer/polarizer/protective film Functional layer/support/phase difference film/pressure sensitive adhesive/protective film/shock absorbing layer/pressure sensitive adhesive/polarizer/protective film The laminate according to the embodiment of the present invention may be used as one protective film and a common cellulose acetate film may be used as the other protective film. In this case, as the other protective film, it is preferable to use a cellulose acetate film produced by a solution casting method and stretched in the width direction in the form of a roll film at a stretch ratio of 10% to 100%.

In addition, of the two protective films of the polarizer, a film other than the laminate according to the embodiment of the present invention is also preferably an optical compensation film having an optical compensation layer including an optically anisotropic layer. The optical compensation film (phase difference film) is capable of improving the viewing angle of a liquid crystal screen. As the optical compensation film, known films can be used, but from the viewpoint of widening the viewing angle, the optical compensation film described in JP2001-100042A is preferable.

As the polarizer, there are an iodine-based polarizer, a dye-based polarizer using a dichroic dye, and a polyene-based polarizer. The iodine-based polarizer and the dye-based polarizer are generally produced using a polyvinyl alcohol-based film.

In addition, as the polarizer, a known polarizer, and a polarizer cut out from a long polarizer whose absorption axis is neither parallel nor perpendicular to the longitudinal direction may be used. A long polarizer whose absorption axis is neither parallel nor perpendicular to the longitudinal direction is prepared by the following method.

That is, a polymer film such as a polyvinyl alcohol-based film that is continuously supplied is stretched by applying tension while being held by holding means, and stretched at least 1.1 to 20.0 times in the film width direction. Thereafter, the polarizer can be produced by a stretching method in which the film is bent in a state in which the both ends of the film are held while setting the film transport direction such that a difference in the longitudinal traveling speed of a holding device at both ends of the film is within 3%, and an angle formed between the film transport direction and the substantial stretching direction of the film at the exit of a step of holding both ends of the film is inclined at an angle of 20° to 70°. Particularly, the stretching method in Which an angle formed between the film transport direction and the substantial stretching direction of the film at the exit of a step of holding both ends of the film is inclined at 45° is preferably used from the viewpoint of productivity.

As for the stretching method of the polymer film, the description in paragraphs 0020 to 0030 of JP2002-086554A can be applied.

EXAMPLES

Hereinafter, the present invention will be more specifically described based on examples. The present invention is not construed as being limited thereby. In the following examples, "part" and "%" showing the composition are based on mass unless otherwise specified.

<1-1. Preparation of Resin Film (TAC Film Having Thickness of 100 μm)>

A laminate film of cellulose acylate having three layers of outer layer/core layer/outer layer was prepared by the following method.

(1) Preparation of Cellulose Acylate Dope Solution for Core Layer

The following composition was put into a mixing tank and stirred, thereby preparing a cellulose acylate dope solution for a core layer.

(Cellulose Acylate Dope Solution for Core Layer)

Cellulose acetate with acetyl substitution degree of 2.88 and weight-average molecular weight of 260,000 100 parts by mass Phthalic acid ester oligomer represented by Formula (A-1) 10 parts by mass Compound represented by Formula (A-2) 4 parts by mass Ultraviolet absorber represented by Formula (A-3) (manufactured by BASF SE) 2.7 parts by mass Light stabilizer (trade name: TINUVIN123, manufactured by BASF SE) 0.18 parts by mass N-alkenylpropylenediamine triacetic acid (trade name: TEKURAN DO manufactured by Nagase ChemteX Corporation) 0.02 parts by mass Methylene chloride (first solvent) 430 parts by mass Methanol (second solvent) 64 parts by mass The used compounds are shown below.

The weight-average molecular weight of the phthalic acid ester oligomer (A-1) having the following structure is 750.

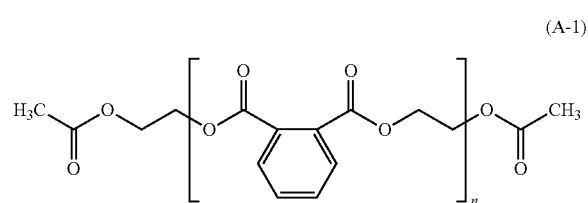
(A-1)

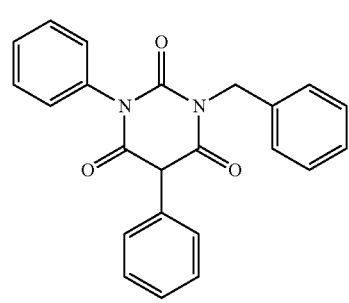
(A-2)

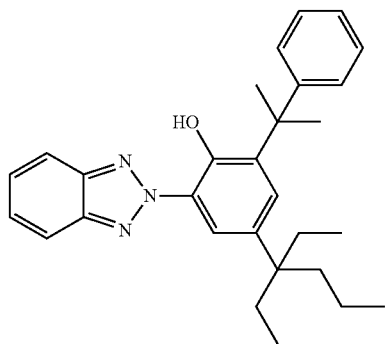
(A-3)

(2) Preparation of Cellulose Acylate Dope Solution for Outer Layer 10 parts by mass of a composition containing inorganic particles shown below was added to 90 parts by mass of the above-mentioned cellulose acylate dope solution for a core layer, thereby preparing a cellulose acylate dope solution for an outer layer.

(Composition Containing Inorganic Particles)

Silica particles having average primary particle diameter of 20 nm (trade name:

| | |
|---|---|
| AEROSIL R972, manufactured by NIPPON AEROSIL CO., LTD) | 2 parts by mass |
| Methylene chloride (first solvent) | 76 parts by mass |
| Methanol (second solvent) | 11 parts by mass |
| Cellulose acylate dope solution for core layer | 1 part by mass |

(3) Preparation of Resin Film

Three kinds of solutions including the cellulose acylate dope solution for an outer layer, the cellulose acylate dope solution for a core layer, and the cellulose acylate dope solution for an outer layer were simultaneously cast onto a casting band with a surface temperature of 20° C. from a casting outlet such that the cellulose acylate dope solution for an outer layer was arranged on both sides of the cellulose acylate dope solution for a core layer.

As the casting band, an endless band which was formed of stainless steel and had a width of 2.1 m and a length of 70 m was used. The casting band was polished such that the casting band had a thickness of 1.5 mm and a surface roughness of 0.05 μm or less. The material of the casting band used was SUS 316, and the casting band used had sufficient corrosion resistance and hardness. The thickness unevenness of the entirety of the casting band was 0.5% or less.

The surface of the obtained casting film was exposed to the air for fast drying with a gas concentration of 16% and a temperature of 60° C. at a wind speed of 8 m/s, thereby forming an initial film. Then, drying air at a temperature of 140° C. was blown to the film from the upstream side of the upper portion of the casting band. In addition, drying air at a temperature of 120° C. and drying air with a temperature of 60° C. were blown to the film from the downstream side.

After the amount of residual solvent was controlled to about 33% by mass, the film was peeled off from the band. Next, both ends of the obtained film in the width direction were fixed to tenter clips, and then the film in which the amount of residual solvent was 3% to 15% by mass was dried while being stretched by 1.06 in the horizontal direction. Then, the film was transported between rolls of a heat treatment device such that the film was further dried, thereby preparing a TAC film having a thickness of 100 μm (outer layer/core layer/outer layer=3 μm/94 μm/3 μ).

(4) Preparation of Resin Films (TAC Films Having Different Thicknesses)

TAC films having different thicknesses were prepared in the same manner as described above except that the respective thicknesses were adjusted to 80 μm (outer layer/core layer/outer layer=3 μm/74 μm/3 μm) and 200 μm (outer layer/core layer/outer layer=3 μm/194 μm/3 μm).

<2. Preparation of Resin Film (PI Film Having Thickness of 50 μm)>

(1) Production of Polyimide Powder 832 g of N, N-dimethylacetamide (DMAc) was put into a 1 L reaction container equipped with a stirrer, a nitrogen injection device, a dropping funnel, a thermometer, and a cooling pipe under a nitrogen stream, and then the temperature of the reaction container was set to 25° C. Here, 64.046 g (0.2 mol) of bistrifluoromethylbenzidine (TFDB) was added and dissolved therein to obtain a solution. While the obtained solution was held at 25° C., 31.09 g (0.07 mol) of 2,2-bis(3,4-dicarboxyphenyl) hexafluoropropane dianhydride (6FDA) and 8.83 g (0.03 mol) of biphenyltetracarboxylic dianhydride (BPDA) were added and stirred for a certain period of time to carry out the reaction. Then, 20.302 g (0.1 mol) of terephthaloyl chloride (TPC) was added to obtain a polyamic acid solution having a solid concentration of 13% by mass. Next, 25.6 g of pyridine and 33.1 g of acetic anhydride were added to this polyamic acid solution and the materials were stirred for 30 minutes, and further, stirred at 70° C. for 1 hour. Then, the resultant was cooled to normal temperature. Here, 20 L of methanol was added thereto, and the precipitated solid content was filtered and pulverized. Thereafter, the resultant was dried at 100° C. for 6 hours in vacuum to obtain 111 g of solid polyimide powder.

(2) Preparation of Resin Film 100 g of solid polyimide powder was dissolved in 670 g of N,N-dimethylacetamide (DMAc) to obtain a 13% by mass solution. The obtained solution was cast on a stainless steel plate so that the thickness after heating was 50 pm and dried with hot air at 130° C. for 30 minutes, Then, the film was peeled off from the stainless steel plate and fixed to a frame with a pin. The frame on which the film was fixed was put into a vacuum oven, heated for 2 hours while gradually increasing the heating temperature from 100° C. to 300° C., and then gradually cooled. The film after cooling was separated from the frame and then as the final heat treatment step, the film was further heat treated at 300° C. for 30 minutes to prepare a polyimide film having a thickness of 50 μm.

(3) Preparation of Resin Film (PI Film Having Different Thickness)

A polyimide film having a thickness of 80 μm was prepared in the same manner as described above.

<2-1. Preparation of Curable Composition for Forming Hard coat Layer (HC Layer)>

Each components were mixed according to the formulation shown in Table 1 below and filtered through a polypropylene filter having a pore diameter of 10 μm to prepare curable compositions for forming an HC layer B-1 to B-4.

TABLE 1

|  | B-1 | B-2 | B-3 | B-4 |
| --- | --- | --- | --- | --- |
| Polymerizable monomer 1 | KAYARAD DPHA 100 parts by mass | KAYARAD DPHA 100 parts by mass | KAYARAD DPHA 100 parts by mass | KAYARAD DPHA 100 parts by mass |
| Polymerizable monomer 2 | Not contained — | CYCLOMER M100 113.8 parts by mass | LIGHT ESTER 2EG 110 parts by mass | Not contained — |
| Silica particle | Not contained — | Not contained — | Not contained — | MEK-AC-2140Z 272.4 parts by mass |
| Photopolymerization initiator 1 | Irg184 3.9 parts by mass | Irg184 8.4 parts by mass | Irg184 8.1 parts by mass | Irg184 8.1 parts by mass |
| Photopolymerization initiator 2 | Not contained — | CPI-100P 3.4 parts by mass | Not contained — | Not contained — |
| Fluorine-containing compound | RS90 9.0 parts by mass | RS90 19.6 parts by mass | RS90 18.9 parts by mass | RS90 18.9 parts by mass |
| Solvent 1 | MEK 33.8 parts by mass | MEK 73.4 parts by mass | MEK 71.0 parts by mass | MEK 150.8 parts by mass |
| Solvent 2 | MIBK 62.9 parts by mass | MIBK 136.6 parts by mass | MIBK 132.0 parts by mass | Not contained — |

In Table 1 above, the formulation ratio is expressed by parts by mass. In addition, "−"indicates that the component is not contained.

The details of each compound listed in Table 1 are shown below.

<Radically Polymerizable Compound>

KAYARAD DPHA: Mixture of dipentaerythritol pentaacrylate and dipentaerythritol hexaacrylate (trade name, manufactured by Nippon Kayaku Co., Ltd.)

LIGHT ESTER 2EG: Diethylene glycol dimethacrylate (trade name, manufactured by Kyoeisha Kayaku. Co., Ltd.)

<Cationically Polymerizable Compound>

CYCLOMER M100: 3,4-epoxycyclohexyl methyl methacrylate (trade name, manufactured by Daicel Chemical Industries, Ltd.)

<Silica Particle>

MEK-AC-2140Z: (trade name, manufactured by Nissan Chemical Industry Co., Ltd., spherical silica particles with an average primary particle diameter of 10 to 20 nm)

<Polymerization Initiator>

Irg 184: 1-hydroxy-cyclohexyl-phenyl-ketone (α-hydroxyalkylphenone-based radical photopolymerization initiator, trade name: IRGACURE 184, manufactured by BASF SE)

CPI-100P: Trialsulfonium salt-based photocationic polymerization initiator (trade name, manufactured by San-Apro Ltd.)

<Fluorine-Containing Compound>

RS90: Fluorine-containing oligomer having radically polymerizable group (manufactured by DIC Corporation)

<Solvent>
MEK: Methyl ethyl ketone
MIBK: Methyl isobutyl ketone
<3-1. Preparation of Coating Solutions for Forming Shock Absorbing Layer C-1 to C-5>
Each component at the composition shown in Table 2 below was mixed and filtered through a polypropylene filter having a pore diameter of 10 μm to prepare compositions for forming a shock absorbing layer C-1 to C-4.

TABLE 2

|  | C-1 | C-2 | C-3 | C-4 | C-5 |
|---|---|---|---|---|---|
| Elastomer | KURARITY LA2140e 100 parts by mass | KURARITY LA2250 100 parts by mass | KURARITY LA4285 100 parts by mass | VYLON UR2300 100 parts by mass | HYBRAR 7311 100 parts by mass |
| Solvent | MIBK 81.8 parts by mass | MIBK 81.8 parts by mass | MIBK 81.8 parts by mass | | |

In Table 2 above. "–" indicates that the component is not contained.
The details of the compounds listed in Table 2 are shown below
<Elastomer>
KURARITY LA2140e, KURARITY LA2250, and KURARITY LA4285: PMMA-PnBA copolymer elastomer (trade name, manufactured by KURARAY CO., LTD)
VYLON UR2300: Urethane modified polyester (trade name, manufactured by TOYOBO CO., LTD.)
HYBRAR 7311: hydrogenated product of styrene-vinyl isoprene block copolymer (trade name, manufactured by KURARAY CO., LTD.)

Example 1

<4. Preparation of Laminate>
<4-1. Formation of Hard coat Layer (HC Layer)>
A curable composition for forming an HC layer B-1 was applied to one surface of the prepared TAC film having a thickness of 100 μm, and cured to form an HC layer having a thickness of 10 μm. Thus, a resin film with the HC layer was prepared.
Specifically, the application and curing method was as follows. The curable composition for forming an HC layer was applied by a die coating method using a slot die described in Example 1 of JP2006-122889A under the condition of a transport speed of 30 m/min, and dried at an atmosphere temperature of 60° C. for 150 seconds. Thereafter, further, under nitrogen purge, the applied curable composition for forming an HC layer was cured by being irradiated with ultraviolet rays at an irradiance of 300 mW/cm$^2$ and an irradiation dose of 600 mJ/cm$^2$ using an air-cooled metal halide lamp (manufactured by Eye Graphics Co., Ltd.) of 160 W/cm with an oxygen concentration of about 0.1% by volume such that an HC layer was formed, and then the obtained film was wound up.
<4-2. Formation of Shock Absorbing Layer>
The composition for a shock absorbing layer C-1 was applied to on the surface of the support opposite to the surface on which the HC layer was formed and dried to form a shock absorbing layer.
Specifically, the application and drying method was as follows. The composition for forming a shock absorbing layer was applied by a die coating method using a slot die described in Example 1 of JP2006-122889A under the condition of a transport speed of 30 m/min so that the film thickness after drying was 50 μm, and dried at an atmosphere temperature of 120° C. for 120 seconds to prepare a laminate of Example 1.

Examples 2 and 3

Laminates of Examples 2 and 3 were prepared in the same manner as in Example 1 except that instead of using the composition for forming a shock absorbing layer C-1, the compositions for forming a shock absorbing layer C-2 and C-3 were used.

Examples 4 to 6

Laminates of Examples 4 to 6 were prepared in the same manner as in Example 2 except that the film thicknesses of the shock absorbing layers were respectively set to 10 μm, 25 μm, and 100 μm.

Examples 7, 8, 13, and 14

Laminates of Examples 7, 8, 13, and 14 were prepared in the same manner as in Example 2 except that instead of the TAC film having a thickness of 100 μm, TAC films having thicknesses of 80 μm and 200 μm, and PI films having thicknesses of 50 μm and 80 μm were used.

Examples 9 to 11

Laminates of Examples 9 to 11 were prepared in the same manner as in Example 2 except that instead of the curable composition for forming an HC layer B-1, curable compositions for forming an HC layer B-2 to B-4 were used.

Example 12

A laminate of Example 12 was prepared in the same manner as in Example 2 except that the thickness of the HC layer was changed to 5 μm.

Examples 15 and 16

Laminates of Examples 15 and 16 were prepared in the same manner as in Examples 2 and 10 except that an inorganic oxide layer (AR layer) was formed on the HC layer of the resin film with an HC layer.
Specifically, the AR layer was formed by a sputtering method under any film forming pressure condition such that the layer structure was $Nb_2O_5/Sio_2/Nb_2O_5/Sio_2$ from the HC layer side and the film thickness of each layer was 15 nm/25 nm/105 nm/85 nm.

Comparative Example 1

A laminate of Comparative Example 1 was prepared in the same manner as in Example 1 except that the shock absorbing layer was not provided.

Comparative Example 2

A laminate of Comparative Example 2 was prepared in the same manner as in Example 1 except that instead of the composition for forming a shock absorbing layer C-1, the composition for forming a shock absorbing layer C-4 was used,

Comparative Example 3

A laminate of Comparative Example 3 was prepared in the same manner as in Example 1 except that instead of the composition for forming a shock absorbing layer C-1, two layers of pressure sensitive adhesive (trade name: SK-2057, manufactured by Soken Chemical & Engineering Co., Ltd.) having a thickness of 25 μm were laminated, and instead of the composition for forming a shock absorbing layer C-1, the composition for forming a shock absorbing layer C-5 was used.

(Measurement of Storage Modulus and Loss Modulus and Derivation of Maximum Value of Tan δ and Frequency Showing Maximum Value)

The storage modulus, the loss modulus, the maximum value of tan δ, and the frequency showing the maximum value of the shock absorbing layer at 25° C. were measured by the above method and derived.

Figure 3:
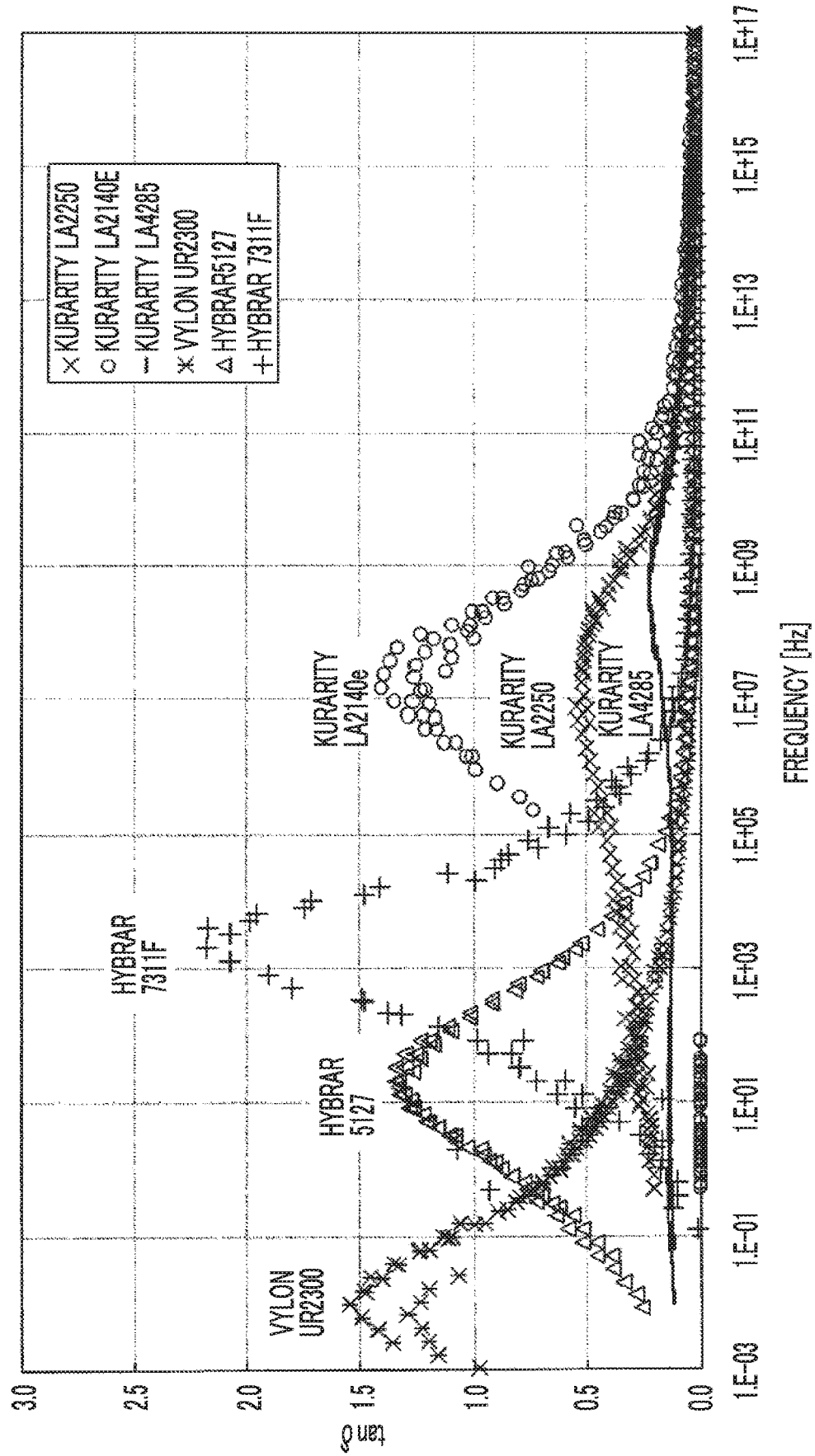
FIG. 3 is a view showing a relationship between a frequency at 25° C. and tan δ of a shock absorbing layer.

FIG. 3 is a graph showing the dependence of tan δ on frequency of each of the obtained samples at 25° C.

<Test>

The following tests were conducted on the laminates prepared above. The test results are summarized in Table 3 below (Transfer of Shape of Another Object to Hard coat Layer (Keyboard Reflection))

The shock absorbing layer side of the prepared optical film (laminate) and a glass plate (280 mm wide×180 mm long×0.5 mm thick) were bonded to each other through a pressure sensitive adhesive (trade name: SK-2057, manufactured by Soken Chemical & Engineering Co., Ltd.) having a thickness of 20 μm by using a rubber roller under a load of 2 kg applied thereto such that the shock absorbing layer side and the glass plate faced each other.

The glass plate bonded to the laminate was fixed with a tape or the like so that the glass plate was in contact with the display of a notebook (Macbook, manufactured by Apple Inc.), the notebook PC was placed on a vibration tester (m060, manufactured by IMV Technologies) in a closed state, and the notebook PC was fixed by loading a load of 10 kg on the notebook PC not to be moved in an X-Y direction. Then, the notebook PC was vibrated in a Z-axis direction for 180 minutes under the random vibration test level 1 conditions described in JIS Z 0232. The X-Y direction refers to an in-plane direction of the laminate and the Z-axis direction refers to a direction orthogonal to the in-plane direction of the laminate.

After completion of the vibration, the sample was taken out and scratches and the degree of cratering by the keyboard were evaluated according to the following indices.

A: Cratering or scratches are not visible at all.

B: Cratering or scratches are slightly visible but there is no problem in practical use.

C: Cratering or scratches are partially visible but there is no problem in practical use.

D: Visible cratering or scratches are partially generated and there is a problem in practical use.

E: Visible cratering or scratches are generated on the entire surface and there is a problem in practical use.

(Falling Ball Resistance)

A glass plate (trade name: EAGLE XG, manufactured by Corning Incorporated, thickness: 0.4 mm) and the laminate prepared above were bonded to each other through a pressure sensitive adhesive having a thickness of 20 μm (trade name: SK-2057, manufactured by Soken Chemical & Engineering Co., Ltd.) by using a rubber roller under a load of 2 kg applied thereto such that the shock absorbing layer side and the glass plate faced each other.

The glass plate bonded to the laminate was installed on a base formed of stainless steel such that the glass plate was in contact with the base. Then, an iron ball (diameter: 3.3 cm, mass: 150 g) was allowed to fall from a predetermined height such that the iron ball contacted and collided with the HC layer of the laminate (the AR layer in the laminate having the AR layer formed therein).

Thereafter, the glass plate was observed, and the highest value among height values at which cracks and breakage were bot observed was used as an impact resistance height (cm).

TABLE 3

| | Support | | HC Layer | | | Shock absorbing layer | | | | | | | Evaluation result | |
|---|---|---|---|---|---|---|---|---|---|---|---|---|---|---|
| | Kind | Film thickness | Kind | Film thickness | Coating solution | Raw material | Kind | Film thickness | Frequency at maximum value of tan δ | Storage modulus [MPa] | Loss modulus [MPa] | Maximum value of tan δ | Coating solution | AR Layer | Trasfer of shape of another object on HC layer | Falling ball resistance |
| Example 1 | TAC | 100 μm | DPHA | 10 μm | B-1 | KURARITY LA2140 | PMMA-PnBA | 50 μm | 1.6 × 10^7 Hz | 37 | 52 | 1.4 | C-1 | Not provided | A | 70 cm |
| Example 2 | TAC | 100 μm | DPHA/LIGHT ESTER2EG | 10 μm | B-1 | KURARITY LA2250 | PMMA-PnBA | 50 μm | 2.8 × 10^7 Hz | 308 | 169 | 0.5 | C-2 | Not provided | A | 70 cm |
| Example 3 | TAC | 100 μm | DPHA | 10 μm | B-1 | KURARITY LA4285 | PMMA-PnBA | 50 μm | 3.0 × 10^8 Hz | 2,274 | 510 | 0.2 | C-3 | Not provided | A | 70 cm |
| Example 4 | TAC | 100 μm | DPHA | 10 μm | B-1 | KURARITY LA2250 | PMMA-PnBA | 10 μm | 2.8 × 10^7 Hz | 308 | 169 | 0.6 | C-2 | Not provided | C | 30 cm |
| Example 5 | TAC | 100 μm | DPHA | 10 μm | B-1 | KURARITY LA2250 | PMMA-PnBA | 25 μm | 2.8 × 10^7 Hz | 308 | 169 | 0.6 | C-2 | Not provided | B | 50 cm |
| Example 6 | TAC | 100 μm | DPHA | 10 μm | B-1 | KURARITY LA2250 | PMMA-PnBA | 100 μm | 2.8 × 10^7 Hz | 308 | 169 | 0.6 | C-2 | Not provided | A | 100 cm |
| Example 7 | TAC | 80 μm | DPHA | 10 μm | B-1 | KURARITY LA2250 | PMMA-PnBA | 50 μm | 2.8 × 10^7 Hz | 308 | 169 | 0.6 | C-2 | Not provided | A | 50 cm |
| Example 8 | TAC | 200 μm | DPHA | 10 μm | B-1 | KURARITY LA2250 | PMMA-PnBA | 50 μm | 2.8 × 10^7 Hz | 308 | 169 | 0.6 | C-2 | Not provided | A | 100 cm |
| Example 9 | TAC | 100 μm | DPHA/CYCLOMER | 10 μm | B-2 | KURARITY LA2250 | PMMA-PnBA | 50 μm | 2.8 × 10^7 Hz | 308 | 169 | 0.6 | C-2 | Not provided | B | 70 cm |
| Example 10 | TAC | 100 μm | DPHA/LIGHT ESTER2EG | 10 μm | B-3 | KURARITY LA2250 | PMMA-PnBA | 50 μm | 2.8 × 10^7 Hz | 308 | 169 | 0.6 | C-2 | Not provided | B | 70 cm |
| Example 11 | TAC | 100 μm | DPHA/Silica particles | 10 μm | B-4 | KURARITY LA2250 | PMMA-PnBA | 50 μm | 2.8 × 10^7 Hz | 308 | 169 | 0.6 | C-2 | Not provided | A | 70 cm |
| Example 12 | PI | 50 μm | DPHA | 5 μm | B-1 | KURARITY LA2250 | PMMA-PnBA | 50 μm | 2.8 × 10^7 Hz | 308 | 169 | 0.6 | C-2 | Not provided | B | 70 cm |
| Example 13 | PI | 80 μm | DPHA | 10 μm | B-1 | KURARITY LA2250 | PMMA-PnBA | 50 μm | 2.8 × 10^7 Hz | 308 | 169 | 0.6 | C-2 | Not provided | A | 70 cm |
| Example 14 | TAC | 100 μm | DPHA | 10 μm | B-1 | KURARITY LA2250 | PMMA-PnBA | 50 μm | 2.8 × 10^7 Hz | 308 | 169 | 0.6 | C-2 | Not provided | A | 70 cm |
| Example 15 | TAC | 100 μm | DPHA | 10 μm | B-1 | KURARITY LA2250 | PMMA-PnBA | 50 μm | 2.8 × 10^7 Hz | 308 | 169 | 0.6 | C-2 | Not provided | B | 70 cm |
| Example 16 | TAC | 100 μm | DPHA/LIGHT ESTER2EG | 10 μm | B-3 | KURARITY LA2250 | PMMA-PnBA | 50 μm | 2.8 × 10^7 Hz | 308 | 169 | 0.6 | C-2 | Not provided | A | 70 cm |
| Comparative Example 1 | TAC | 100 μm | DPHA | 10 μm | B-1 | Not Contained | — | — | — | — | — | — | — | Not provided | E | 5 cm |
| Comparative Example 2 | TAC | 100 μm | DPHA | 10 μm | B-1 | VYLON UR2300 | Urethane modified polyester | 50 μm | 1.0 × 10^-2 Hz | 18 | 29 | 1.5 | C-4 | Not provided | C | 10 cm |
| Comparative Example 3 | TAC | 100 μm | DPHA | 10 μm | B-1 | SK2057 | Polystyrene-polyisoprene | 50 μm | 4.3 × 10^3 Hz | 210 | 462 | 2.2 | C-5 | Not provided | E | 20 cm |

As shown in Table 3, in the laminates of Examples, the transfer of the shape of another object to the hard coat layer (keyboard reflection) was sufficiently suppressed and the falling ball resistance was also excellent.

in the laminate of Comparative Example 1 not having the shock absorbing layer, both the transfer of the shape of another object to the hard coat layer (keyboard reflection) and the falling ball resistance were deteriorated. In addition, in the laminates of Comparative Examples 2 and 3 having the maximum value of tan δ outside the predetermined frequency range of the present invention and having a shock absorbing layer formed of a urethane-based resin and an acrylic pressure sensitive adhesive, there was no problem in falling ball resistance but the transfer of the shape of another object to the hard coat layer (keyboard reflection) could not be suppressed.

In a case where the laminate of the present invention is used as a polarizing plate, it is considered that the polarizing plate can sufficiently suppress the transfer of the shape of another object to the hard coat layer (keyboard reflection) and has excellent falling ball resistance.

EXPLANATION OF REFERENCES

1A: hard coat layer (HC layer)
2A: support
3A: shock absorbing layer
4A, 4B: laminate
5A: inorganic oxide layer (AR layer)

What is claimed is:

1. A laminate comprising:
a shock absorbing layer;
a support; and
a hard coat layer,
wherein the shock absorbing layer has a maximum value of tan δ in a frequency range of $10^4$ to $10^{13}$ Hz at 25° C., and
wherein the maximum value of tan δ is 0.1 or more and 0.6 or less,
where the tan δ is a ratio of a loss modulus with respect to a storage modulus.

2. The laminate according to claim 1,
wherein the maximum value of tan δ is 0.1 or more.

3. The laminate according to claim 1,
wherein a storage modulus of the shock absorbing layer at a frequency showing the maximum value of tan δ is 30 MPa or more.

4. The laminate according to claim 1,
wherein the shock absorbing layer has a thickness of 10 to 200 μm.

5. The laminate according to claim 1,
wherein the shock absorbing layer includes a block copolymer of methyl methacrylate and n-butyl acrylate.

6. The laminate according to claim 1, further comprising:
an inorganic oxide layer.

7. The laminate according to claim 1,
wherein the hard coat layer includes a cured product of a polymerizable compound.

8. The laminate according to claim 1,
wherein shock absorbing layer is formed on an entire surface of the support.

9. A polarizing plate comprising:
a polarizer; and
the laminate according to claim 1 including the polarizer.

10. An image display device comprising:
the laminate according to claim 1.

11. An image display device comprising:
the polarizing plate according to claim 9.

12. The laminate according to claim 1,
wherein the laminate comprises the shock absorbing layer, the support, and the hard coat layer, in this order.

13. The laminate according to claim 12,
wherein the shock absorbing layer is constituted of a resin selected from the groups consisting of a 1,2-polybutadiene resin, a polyolefin resin, a polyvinyl chloride resin, a polystyrene resin, a polyacrylic resin, a vinyl ester resin excluding EVA, a saturated polyester resin, a polyamide resin, a fluororesin, a polycarbonate resin, a polyacetal resin, an epoxy resin, a (meth)acrylic resin, an unsaturated polyester resin, and a silicon resin.

14. The laminate according to claim 12,
wherein the shock absorbing layer includes a block copolymer of methyl methacrylate and n-butyl acrylate.

15. The laminate according to claim 12,
wherein a storage modulus of the shock absorbing layer at a frequency showing the maximum value of tan δ is 50 MPa or more and 1000 MPa or less, and
the shock absorbing layer has a maximum value of tan δ in a frequency range of $10^6$ to $10^{11}$ Hz at 25° C.

* * * * *